(12) United States Patent
Cheng et al.

(10) Patent No.: US 11,151,582 B2
(45) Date of Patent: Oct. 19, 2021

(54) SMART LOGISTICS MANAGEMENT USING BLOCKCHAIN

(71) Applicant: ALIPAY (HANGZHOU) INFORMATION TECHNOLOGY CO., LTD., Hangzhou (CN)

(72) Inventors: Long Cheng, Hangzhou (CN); Yanpeng Li, Hangzhou (CN)

(73) Assignee: ALIPAY (HANGZHOU) INFORMATION TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/945,476

(22) Filed: Jul. 31, 2020

(65) Prior Publication Data
US 2021/0182872 A1    Jun. 17, 2021

Related U.S. Application Data

(63) Continuation of application No. PCT/CN2019/125343, filed on Dec. 13, 2019.

(51) Int. Cl.
| | |
|---|---|
| G06Q 30/00 | (2012.01) |
| G06F 16/27 | (2019.01) |
| G06Q 10/10 | (2012.01) |
| H04L 9/32 | (2006.01) |
| H04L 29/06 | (2006.01) |
| G06Q 50/28 | (2012.01) |

(52) U.S. Cl.
CPC ......... *G06Q 30/0185* (2013.01); *G06F 16/27* (2019.01); *G06Q 10/10* (2013.01); *G06Q 50/28* (2013.01); *H04L 9/3239* (2013.01); *H04L 63/123* (2013.01); *H04L 2209/38* (2013.01)

(58) Field of Classification Search
None
See application file for complete search history.

(56) References Cited

U.S. PATENT DOCUMENTS

| 10,095,888 B1 * | 10/2018 | Lee | G06F 21/64 |
| 2018/0060496 A1 * | 3/2018 | Bulleit | H04L 9/3239 |

(Continued)

FOREIGN PATENT DOCUMENTS

| CN | 109544160 | 3/2019 |
| CN | 109767213 | 5/2019 |

(Continued)

OTHER PUBLICATIONS

Dylan Yaga et al., "Blockchain Technology Overview", https://doi.org/10.6028/NIST.IR.8202 (Oct. 2018), National Institute of Standards and Technology (Year: 2018).*

(Continued)

*Primary Examiner* — Paul R Fisher
(74) *Attorney, Agent, or Firm* — Seed IP Law Group LLP

(57) ABSTRACT

Disclosed herein are methods, systems, and apparatus, including computer programs encoded on computer storage media, for logistic management through a blockchain network. One of the methods includes storing a smart contract in a blockchain of the blockchain network. The smart contract corresponds to a logistic process. A transaction information about a transaction in the logistic process is verified and validated based on the smart contract and is hashed into the blockchain upon consensus being concluded.

20 Claims, 11 Drawing Sheets

(56) References Cited

U.S. PATENT DOCUMENTS

| | | | |
|---|---|---|---|
| 2018/0232731 A1 | 8/2018 | Liu | |
| 2018/0341910 A1* | 11/2018 | Broveleit | G06Q 50/28 |
| 2019/0325044 A1* | 10/2019 | Gray | G06F 16/284 |

FOREIGN PATENT DOCUMENTS

| | | |
|---|---|---|
| CN | 109767214 | 5/2019 |
| WO | 2019/170174 A2 | 9/2019 |

OTHER PUBLICATIONS

Nick Szabo, "Smart Contracts" https://www.fon.hum.uva.nl/rob/Courses/InformationInSpeech/CDROM/Literature/LOTwinterschool2006/szabo.best.vwh.net/smart.contracts.html (1994) (Year: 1994).*

Rozario, A. M., & Vasarhelyi, M. A. (2018). Auditing with smart contracts. International Journal of Digital Accounting Research, 18, 1-27. doi:http://dx.doi.org/10.4192/1577-8517-v18_1 (Year: 2018).*

The enforceability of smart contracts in india. (Dec. 13, 2019). Mondaq Business Briefing Retrieved from https://dialog.proquest.com/professional/docview/2325593302?accountid=131444 (Year: 2019).*

Hasanetal., "Smart Contract-Based Approach for Efficient Shipment Management", *Computers & Industrial Engineering*. vol. 136, p. 149-159, 2019.

Lam et al., "Textile and Apparel Supply Chain with Distributed Ledger Technology (DLT)", *20th IEEE International Conference on Mobile Data Management (MDM)*. pp. 447-451, 2019.

\* cited by examiner

SMART LOGISTICS MANAGEMENT USING BLOCKCHAIN

TECHNICAL FIELD

This specification relates to blockchain technologies.

BACKGROUND

Distributed ledger systems (DLSs), which can also be referred to as consensus networks, and/or blockchain networks, enable participating entities to store data securely and immutably. Examples of types of blockchain networks can include public blockchain networks, private blockchain networks, and consortium blockchain networks. A consortium blockchain network is provided for a select group of entities that control the consensus process, and includes an access control layer.

Development in computing and communication technologies has enabled consumers to be involved in tracking a logistic process that involves a plurality of entities conducting a plurality of actions sequentially or concurrently. An example of a logistic process includes shipping of a product that involves a seller, one or more transportation carriers, and a buyer. Solutions have been proposed or discussed to use blockchain technologies in recording transactions that occur in a logistic process. Transaction information is batched and stored in a blockchain ledger as blocks. Users may access the transaction information through a platform that supports the blockchain.

In such logistic tracking, it is desirable to have a mechanism for consumers other entities to further contribute in reviewing, monitoring or verifying transaction information in an efficient and trustable way. It is also desirable to include a mechanism to balance between user authentication and user privacy. Therefore, there is a need to achieve further technical and commercial advantages of using a blockchain platform to manage logistics.

SUMMARY

This specification describes computer-implemented methods for implementing logistics management through a consortium blockchain and based on dedicated smart contracts registered with the consortium blockchain. The consortium blockchain is maintained by a network of peer computing nodes ("blockchain network") that are certified and selected to operate as consensus nodes to reach consensus on validating a proposed block containing logistics information. A mechanism to reach consensus among the consensus nodes, referred to as a consensus algorithm, is determined at least partially based on a smart contract dedicated for a specific logistic process. The consensus algorithm imposes a qualification requirement on an individual user to propose transaction information to be added into the blockchain with respect to a section of the logistic process.

In the consensus algorithm, only a certified user having an account with the consortium blockchain network can participate as a participant user in proposing transaction information to be added into the blockchain. The certification is effected through a certification process by a trusted third party authority or authorities. A third party generally refers to a party that operates outside the consortium blockchain network itself. A smart contract deployed on the consortium blockchain may further provide detailed requirements that link a user qualification to a specific section of a logistic process. For example, a smart contract may require that only a certified transportation carrier can propose transaction information with respect to a product shipping section of a logistic process. A smart contract may also specify format requirements on a piece of transaction information of a logistic process to be batched into a block. For example, a smart contract may require that user identification, section identifier, and smart contract identification be included in a proposed transaction information such that the consensus nodes verify those required information before adding a proposed block containing the transaction information into a blockchain. A smart contract may also identify a sequential order of the sections in a logistic process, and may verify proposed transaction information based on the sequential order of the sections. For example, in some cases, transactions of a later section in the sequential order may not be batched into the blockchain before transactions of an earlier section. If a proposed transaction includes a transaction of a later section before an earlier transaction has been batched, a consensus node running the smart contract will not validate the out-of-sequential order transaction and a proposed block containing such out-of-sequential order transaction will not be added into the ledger. In the specification herein, for descriptive purposes, transaction information generated locally at a certificated user is referred to as a "proposed transaction". As appreciated, a "proposed transaction" is not the corresponding transaction event itself and is a piece of information on the relevant transaction event.

A smart contract is initially proposed by a certified participant user ("smart contract owner") to register with the consortium blockchain network. The terms of the proposed smart contract is reviewed and registered by the consensus nodes of the consortium blockchain or by a separate layer of consensus nodes as a network. Alternatively or additionally, the terms of a proposed smart contract is reviewed and certified by a third party authority before being hashed into a blockchain or deployed on a blockchain network to govern a logistic process. After the terms of a proposed smart contract are approved or certified, a platform of the consortium blockchain may generate software codes implementing the smart contract. A smart contract may be stored in the blockchain and be retrieved for execution through triggering transactions; deployed at a separate layer on each consensus nodes; deployed on a middle layer hosted by a service provider, e.g., a host of a consortium blockchain platform, beyond the consortium blockchain; or be implemented via other suitable approaches. A smart contract owner may also directly generate software codes of a proposed smart contract, e.g., using Solidity or other suitable programming languages, for review, certification, and registration with a consortium blockchain network.

In some embodiments, after a logistic process is established as being governed by a smart contract, the smart contract or a portion thereof becomes at least a portion of a consensus algorithm for the consensus nodes to follow in verifying and validating a piece of transaction information of the logistic process. The smart contract may also be accessible to a user selected to participate in the logistic process and may facilitate the generation of transaction information on a logistic transaction at the user device. For example, a user application on the user device may automatically collect respective transaction data through sensors, and create packages of transaction information using the sensor data according to the requirements of the smart contract. The created transaction information will then be verified by the consensus nodes based on the consensus algorithm that is in line with the smart contract.

Upon being certified or registered with a certificate authority, a consumer may join the logistic process as a participant user and may provide consumer feedback to be stored in the blockchain under the relevant smart contract. Through registration with the certificate authority, the private information of the consumer is shielded from the blockchain network or any participant user/consensus node of the blockchain network. Consumer feedback is also verified by the consensus nodes based on the smart contract. After the consumer feedback is batched into the blockchain, further analysis of the consumer feedback is conducted according to the smart contract. For example, complaints or bad reviews targeting a same participant user in logistic processes under the same smart contract are accumulated. When the accumulated number of complaints reaches a threshold, the complaints are sent to a third party authority to further process.

A participant user does not store a copy of the ledger in the consortium blockchain network. A participant user does not function as a mining node either, e.g., the participant user does not have the permission to propose a block. A participant user can propose a transaction for a mining node to include the proposed transaction in a proposed block. A participant user may also conduct the roles of a mining node and/or a consensus node of the same consortium blockchain network.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides one or more systems for implementing the methods provided herein. The systems typically include one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
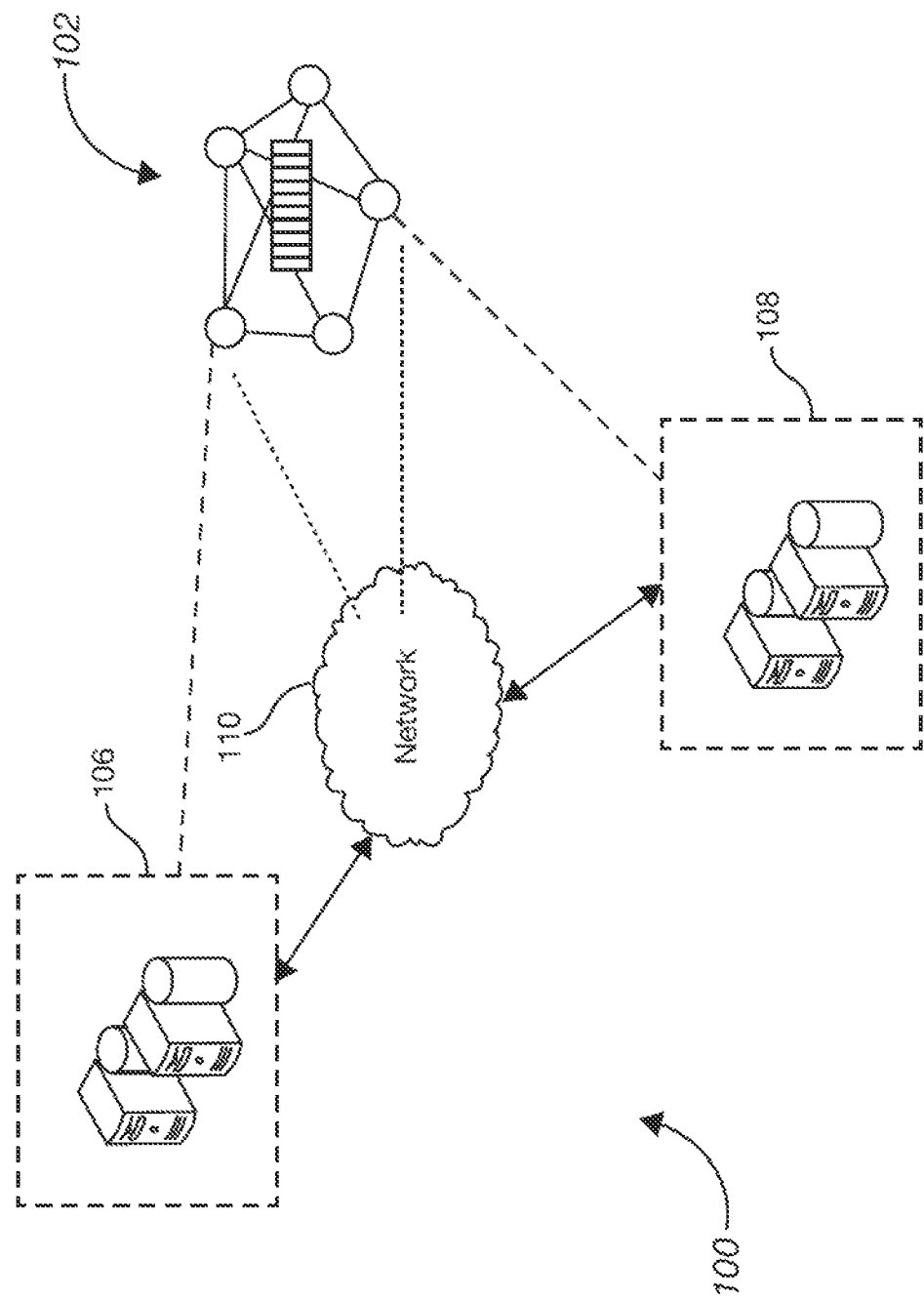
FIG. 1 is a diagram illustrating example environments that can be used to execute embodiments of this specification.

This specification describes computer-implemented methods for implementing logistics management through a consortium blockchain and based on dedicated smart contracts registered with the consortium blockchain. The consortium blockchain is maintained by a network of peer computing nodes ("blockchain network") that are certified and selected to operate as consensus nodes to reach consensus on validating a proposed block containing logistics information. A mechanism to reach consensus among the consensus nodes, referred to as a consensus algorithm, is determined at least partially based on a smart contract dedicated for a specific logistic process. The consensus algorithm imposes a qualification requirement on an individual user to propose transaction information to be added into the blockchain with respect to a section of the logistic process.

In the consensus algorithm, only a certified user having an account with the consortium blockchain network can participate as a participant user in proposing transaction information to be added into the blockchain. The certification is effected through a certification process by a trusted third party authority or authorities. A third party generally refers to a party that operates outside the consortium blockchain network itself. A smart contract deployed on the consortium blockchain may further provide detailed requirements that link a user qualification to a specific section of a logistic process. For example, a smart contract may require that only a certified transportation carrier can propose transaction information with respect to a product shipping section of a logistic process. A smart contract may also specify format requirements on a piece of transaction information of a logistic process to be batched into a block. For example, a smart contract may require that user identification, section identifier, and smart contract identification be included in a proposed transaction information such that the consensus nodes verify those required information before adding a proposed block containing the transaction information into a blockchain. A smart contract may also identify a sequential order of the sections in a logistic process, and may verify proposed transaction information based on the sequential order of the sections. For example, in some cases, transactions of a later section in the sequential order may not be batched into the blockchain before transactions of an earlier section. If a proposed transaction includes a transaction of a later section before an earlier transaction has been batched, a consensus node running the smart contract will not validate the out-of-sequential order transaction and a proposed block containing such out-of-sequential order transaction will not be added into the ledger. In the specification herein, for descriptive purposes, transaction information generated locally at a certificated user is referred to as a "proposed transaction". As appreciated, a "proposed transaction" is not the corresponding transaction event itself and is a piece of information on the relevant transaction event.

A smart contract is initially proposed by a certified participant user ("smart contract owner") to register with the consortium blockchain network. The terms of the proposed smart contract is reviewed and registered by the consensus nodes of the consortium blockchain or by a separate layer of consensus nodes as a network. Alternatively or additionally, the terms of a proposed smart contract is reviewed and certified by a third party authority before being hashed into a blockchain or deployed on a blockchain network to govern a logistic process. After the terms of a proposed smart contract are approved or certified, a platform of the consortium blockchain may generate software codes implementing the smart contract. A smart contract may be stored in the blockchain and be retrieved for execution through triggering transactions; deployed at a separate layer on each consensus nodes; deployed on a middle layer hosted by a service provider, e.g., a host of a consortium blockchain platform, beyond the consortium blockchain; or be implemented via other suitable approaches. A smart contract owner may also directly generate software codes of a proposed smart contract, e.g., using Solidity or other suitable programming languages, for review, certification, and registration with a consortium blockchain network.

In some embodiments, after a logistic process is established as being governed by a smart contract, the smart contract or a portion thereof becomes at least a portion of a consensus algorithm for the consensus nodes to follow in verifying and validating a piece of transaction information of the logistic process. The smart contract may also be accessible to a user selected to participate in the logistic process and may facilitate the generation of transaction information on a logistic transaction at the user device. For example, a user application on the user device may automatically collect respective transaction data through sensors, and create packages of transaction information using the sensor data according to the requirements of the smart contract. The created transaction information will then be verified by the consensus nodes based on the consensus algorithm that is in line with the smart contract.

Upon being certified or registered with a certificate authority, a consumer may join the logistic process as a participant user and may provide consumer feedback to be stored in the blockchain under the relevant smart contract. Through registration with the certificate authority, the private information of the consumer is shielded from the blockchain network or any participant user/consensus node of the blockchain network. Consumer feedback is also verified by the consensus nodes based on the smart contract. After the consumer feedback is batched into the blockchain, further analysis of the consumer feedback is conducted according to the smart contract. For example, complaints or bad reviews targeting a same participant user in logistic processes under the same smart contract are accumulated. When the accumulated number of complaints reaches a threshold, the complaints are sent to a third party authority to further process.

A participant user does not store a copy of the ledger in the consortium blockchain network. A participant user does not function as a mining node either, e.g., the participant user does not have the permission to propose a block. A participant user can propose a transaction for a mining node to include the proposed transaction in a proposed block. A participant user may also conduct the roles of a mining node and/or a consensus node of the same consortium blockchain network.

To provide further context for embodiments of this specification, and as introduced above, distributed ledger systems (DLSs) (which can also be referred to as consensus networks, made up of peer-to-peer nodes), and blockchain networks, enable participating entities to securely, and immutably, conduct transactions and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, the recording of transactions on a blockchain is reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. Within a block, the transactions, which have already been verified by the nodes of the blockchain network, are hashed and encoded into a Merkle tree. The Merkle tree is a data structure in which each leaf node includes a hash on a corresponding transaction, and each non-leaf node includes a hash on the concatenation of the hashes in its children. With this process continuing up the tree to the root of the entire tree, the root node includes a hash that is representative of all data in the tree. A hash purporting to be of a transaction stored in the tree can be quickly verified by determining whether it is consistent with the structure of the tree.

Where a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. However, embodiments of this specification can be realized in any appropriate type of blockchain network.

In general, a consortium blockchain network is private among the participating entities. In a consortium blockchain network, the consensus process is controlled by an authorized set of nodes, referred to as consensus nodes, one or more of which are operated by a respective entity (a financial institution, insurance company, etc.). For example, a consortium of ten (10) entities (financial institutions, insurance companies, etc.) can operate a consortium blockchain network, each of which operates at least one node in the consortium blockchain network.

In some examples, within a consortium blockchain network, a global blockchain is provided as a blockchain that is replicated across all nodes. That is, all consensus nodes are typically in perfect state consensus with respect to the global blockchain. To achieve consensus (agreement to the addition of a block to a blockchain), a consensus protocol or algorithm is implemented within the consortium blockchain network. For example, the consortium blockchain network can implement a practical *Byzantine* fault tolerance (PBFT) consensus, described in further detail below.

FIG. 1 is a diagram illustrating an example of an environment 100 that can be used to execute embodiments of this specification. In some examples, the environment 100 enables entities to participate in a consortium blockchain network 102. The environment 100 includes a plurality of computing devices 106, 108, and a network 110. In some examples, the network 110 includes a local area network (LAN), wide area network (WAN), the Internet, or a combination thereof, and connects web sites, user devices (computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the network 110 includes network hardware such as switches, routers, repeaters, electrical cables and optical fibers, light emitters and receivers, radio transmitters and receivers, and the like. In some cases, the computing devices 106, 108 can be nodes of a cloud computing system (not shown), or each computing device 106, 108 can be a separate cloud computing system including a number of computers interconnected by a network and functioning as a distributed processing system.

In the depicted example, the computing systems 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing systems 106, 108 host one or more computer-implemented services for interacting with the consortium blockchain network 102. For example, the computing system 106 can host computer-implemented services of a first entity (user A), such as a transaction management system that the first entity uses to manage its transactions with one or more other entities (other users). The computing system 108 can host computer-implemented services of a second entity (user B), such as a transaction management system that the second entity uses to manage its transactions with one or more other entities (other users). In the example of FIG. 1, the consortium blockchain network 102 is represented as a peer-to-peer network of nodes, and the computing systems 106, 108 provide nodes of the first entity and second entity, respectively, which participate in the consortium blockchain network 102.

Figure 2:
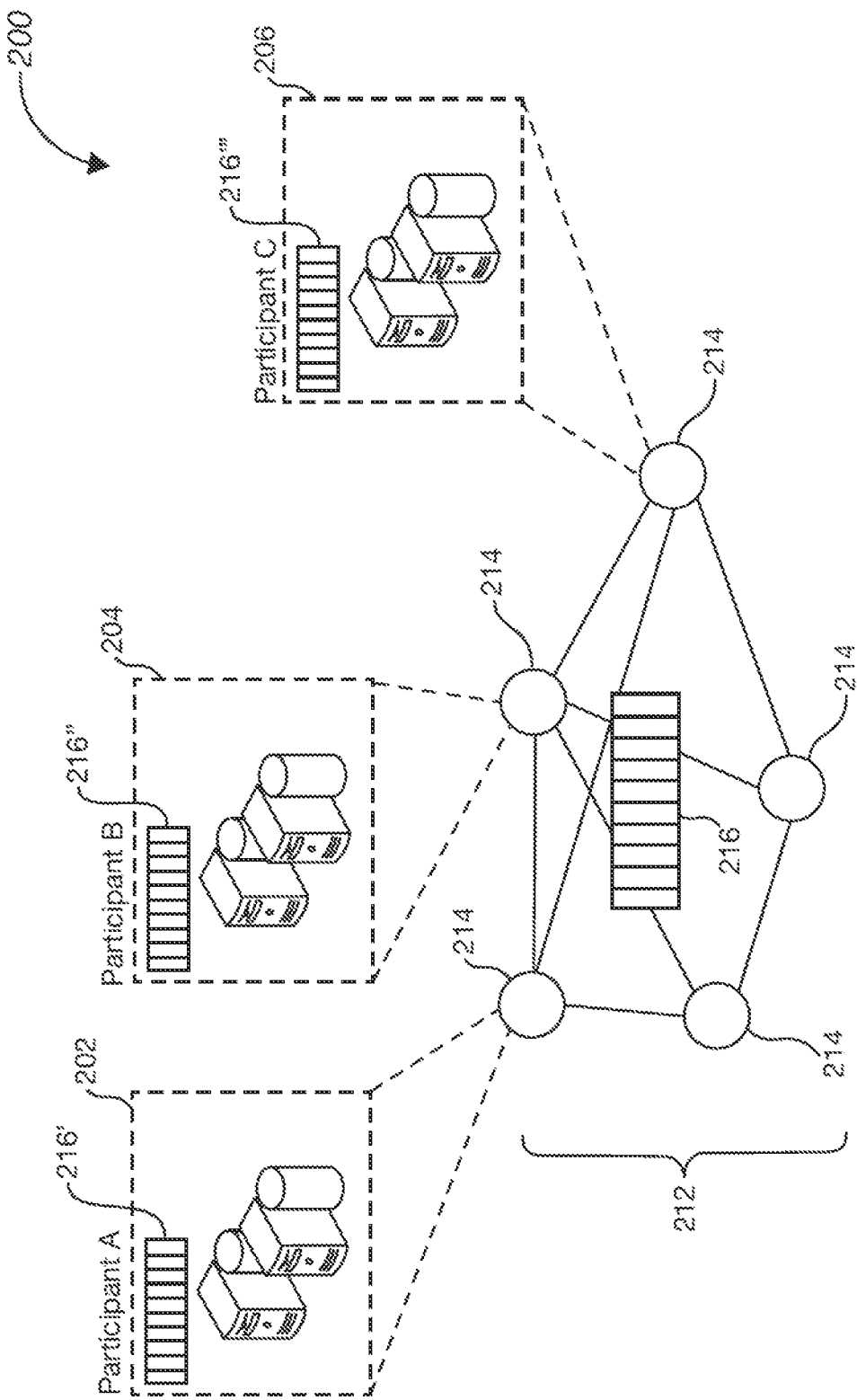
FIG. 2 is a diagram illustrating an example architecture in accordance with embodiments of this specification.

FIG. 2 depicts an example architecture 200 in accordance with embodiments of this specification. The example architecture 200 includes participant systems 202, 204, 206 that correspond to Participant A, Participant B, and Participant C, respectively. Each participant (user, enterprise, etc.) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of, Participant A, Participant B, and Participant C, respectively, and functions as a respective node 214 within the blockchain network 212. As used herein, a node generally refers to an individual system (computer, server, etc.) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through, the blockchain network 212 using a protocol (hypertext transfer protocol secure (HTTPS)), and/ or using remote procedure calls (RPCs).

Nodes 214 can have varying degrees of participation within the blockchain network 212. For example, some nodes 214 can participate in the consensus process (as miner nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204 store respective, complete copies 216', 216", 216'" of the blockchain 216. In the descriptions herein, nodes 214 of the blockchain network 212 are also referred to as "participant user" for descriptive purposes. In some embodiments, some or all of the participant users 214 participate in the consensus process and are referred to as "consensus nodes". The consensus nodes for the blockchain 216 may also include other nodes not selected from the participant users 214. In some other embodiments, consensus nodes for adding blocks to the blockchain 216 do not overlap with the participant users 214 that propose blocks to be added to the blockchain 216.

A blockchain, such as the blockchain 216 of FIG. 2, is made up of a chain of blocks, each block storing data. Examples of data include transaction data representative of a transaction between two or more participants. While transactions are used herein by way of non-limiting example, any appropriate data can be stored in a blockchain (documents, images, video, audio, etc.). Examples of a transaction can include, without limitation, exchanges of something of value (assets, products, services, currency, etc.) or occurrence of some events or activities. The transaction data is immutably stored within the blockchain. That is, an undetectable change cannot be made to the transaction data.

Before being stored in a block, the transaction data is hashed. Hashing is a process of transforming the transaction data, typically provided as string data, into a fixed-length hash value, typically provided as string data. It is not possible to un-hash the hash value to obtain the transaction data. Hashing ensures that even a slight change in the transaction data results in a completely different hash value. Further, and as noted above, the hash value is of a fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, for example, the consensus node generates a block header, hashes all of the transactions in the block, and combines the hash value in pairs to generate further hash values until a single hash value is provided for all transactions in the block (the Merkle root hash). This Merkle root hash is added to the block header. The consensus node also determines the hash value of the most recent block in the blockchain (the last block added to the blockchain) and adds the hash value of the most recent block into the block header. The consensus node also adds a nonce value, and a timestamp to the block header. The block header is hashed, which becomes the hash value of the block.

In general, PBFT provides a practical Byzantine state machine replication that tolerates Byzantine faults (malfunctioning nodes, malicious nodes, etc.). This is achieved in PBFT by assuming that faults will occur (assuming the existence of independent node failures, and/or manipulated messages sent by consensus nodes). In PBFT, the consensus nodes are provided in a sequence that includes a primary consensus node and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each consensus nodes proves that a message is received from a specified peer node and verifies that the message was not modified during transmission.

In PBFT, the consensus protocol is provided in multiple phases with all consensus nodes beginning in the same state. To begin, a client sends a request to the primary consensus node to invoke a service operation (execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

A consensus algorithm refers to a specific mechanism or terms, based on which a transaction or a block is verified and validated to be added into a blockchain. To that extent, a consensus algorithm is viewed as a specific implementation agreement adapted to follow rules of a consensus protocol. Different consensus algorithms may be created for different blockchain networks 212 or different blockchains 216, which all comply with a same consensus protocol.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can encrypt/decrypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

In some embodiments, a logistics management system can be implemented within the blockchain environment 100 of FIG. 1 and using the blockchain architecture 200 of FIG. 2. For example, transaction information of a logistic process is stored as blocks in the blockchain 216.

Figure 3:
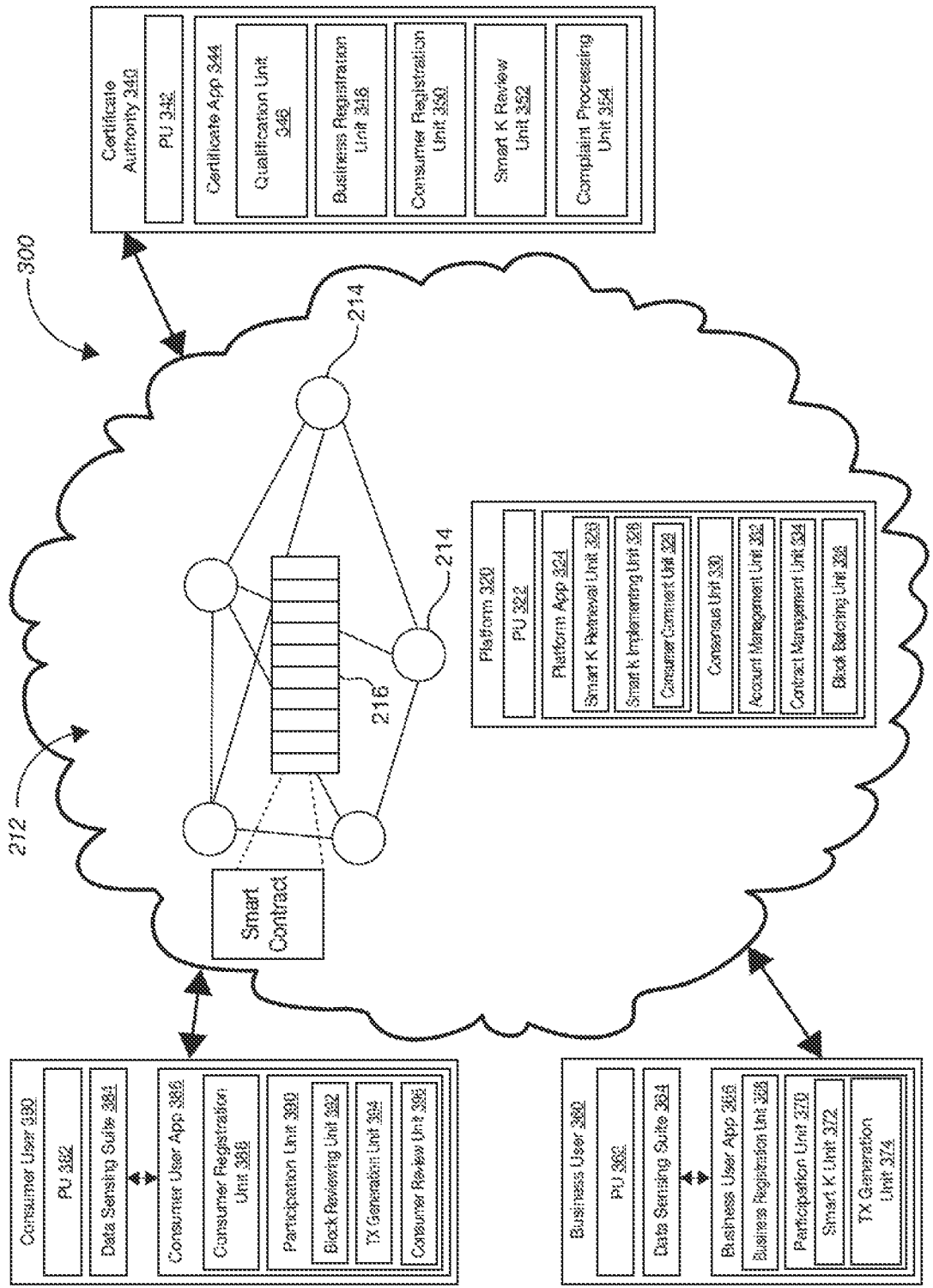
FIG. 3 is an example system of logistics management in accordance with embodiments of this specification.

FIG. 3 is an example system 300 of logistics management. The logistics management environment 300 includes one or more blockchain platforms 320, one or more certificate authorities 340, one or more business users 360 and one or more consumer users 380.

The blockchain platform 320 is a server or servers that function to support the deployment of a blockchain network 212 that business users 360 and consumer users 340 can join to manage and store transaction data into the blockchain 216. The blockchain platform 320 may set up the consensus protocols and rules for the selection and/or qualification of the consensus nodes for the blockchain 216. The blockchain platform 320 also provides user applications to the business users 360 and/or the consumer users 340 to function with the consortium network 212. The blockchain platform 320 also provides applications to the computing systems 202, 204, that implement computing nodes through the computing systems 202, 204, 206.

In some embodiments, a service provider is directly involved or hosts the operation of the blockchain platform 320 under blockchain-as-a-service (BaaS) arrangement. The BaaS services may range from a completely managed distributed ledger system to also functions as a consensus node of the blockchain network 212. In some embodiments, the blockchain platform 320 functions as an administrative node of the blockchain network 212, which has more authorities than other consensus nodes. In some embodiments, the blockchain platform 320 may function as a centralized node to store a ledger without a copy of the ledger being replicated on another node. That is, a blockchain network 212 is not necessarily a distributed ledger system. The blockchain platform 320 may support one or more of a distributed ledger system and a centralized ledger system.

The certificate authority 340 functions to review and certify a business user 360 or a consumer user 380 to be qualified or registered as participant users 214 and/or consensus nodes in the blockchain network 212. The certificate authority 340 also functions to review and certify a smart contract for a logistic process. As used herein, a logistic process refers to any process that involves a set of sequential or concurrent of events, activities, facilities, or supplies or a combination thereof. A smart contract, after being certified by the certificate authority 340, is added to the blockchain 216 upon consensus being concluded.

The certificate authority 340 is a peer in the blockchain network 212 or is a third party that communicates with one or more of the blockchain network 212 or the blockchain platform 320 through the network 110 or other communication channels. In some example embodiments, the certificate authority 340 is a consensus node in a blockchain network dedicated for certification operations.

The platform 320 is a server computer system that includes a processing unit 322 and a platform application 324. The platform application 324 may include software units each having executable codes separately stored and dedicated for implementing a task or tasks of the software units. For example, the platform application includes a smart contract retrieval unit 326, a smart contract implementation unit 328 including a consumer complaint unit 329, a consensus unit 330, an account management unit 332, a contract management unit 334, and a block batching unit 336. The units of the platform application 324 may reside on a same computing device or may reside on multiple computing devices coupled together in a distributed computing environment. In some embodiments, the units of the platform 324 are implemented as application level virtual machines supported by a plurality of host computing devices.

The business user 360 is a computing system that includes a processing unit 362, a data sensing suite 364 and a business user application 366. The data sensing suite 364 may include sensors and/or other data sensing devices that are embedded in a computing device of the business user 360 or coupled to the computing device through electrical or communicational coupling links. For example, the data sensing suite 364 may include radar sensors, motion sensors, temperature sensors, pressure sensors, range sensors, RFID sensors, audio sensors, video sensors, software data sensors, web crawlers, or other sensors or sensing devices. In some embodiments, some of the sensors or sensing devices of the data sensing suite 364 are arranged in an internet of thing ("TOT") environment that obtain data streams on incidents or things in the computing system of the business user 360 or outside the computing system of the business user 360. For example, the TOT environment is used to track the flow of a product or the parts thereof in a logistic process. For example, the sensors of data sensing suite 364 may function to detect or obtain an outdoor or an indoor location of a product, a physical or electronic identification of a product, an image of a product, a shipping process of a product, etc. The data sensing suite 364 may directly communicate with the business user application 366 such that the business user application 366 obtains the transaction data directly from the data sensing suite 364 and automatically generate blocks containing the transaction data.

In some embodiments, the business user application 366 includes software units of a registration unit 368 and a participation unit 370. The participation unit 370 may include a smart contract unit 372 and a transaction ("TX") generation unit 374.

The consumer user 380 is a computing system that includes a processing unit 382, a data sensing suite 384 and a consumer user application 386. The data sensing suite 384 may include sensors and other data sensing devices that are embedded in a computing device of the consumer user 380 or coupled to the computing device through electrical or communicational coupling links. For example, the data sensing suite 384 may include radar sensors, motion sensors, temperature sensors, pressure sensors, audio sensors, video sensors, software data sensors, web crawlers, range sensors, RFID sensors or other sensors or sensing devices. In some embodiments, the data sensing suite 364 may include sensors that are arranged in an internet of thing ("TOT") environment that obtains data streams on things in the computing system of the consumer user 380 or outside the computing system of the consumer user 380. For example, the TOT environment is used to track activities of a consumer and/or information about an environment surrounding the consumer. For example, the data sensing suite 384 may include smart home security sensors that obtain video or image information of a delivery of goods to a consumer or a house of the consumer. The data sensing suite 384 may also include a clock sensor that obtains day/time information of a delivery of goods to the house. The data sensing suite 384 communicates with the consumer user application 386 such that the consumer user application 386 obtains the relevant data directly from the data sensing suite 364 and automatically generates blocks containing the data to be added into the blockchain 216.

The consumer user application 386 includes software units of a consumer registration unit 388 and a participation unit 390. The participation unit 390 includes a block reviewing unit 392, a transaction ("TX") generation unit 394 and a consumer review unit 396. The block reviewing unit 392 enables the consumer user 380 to access blocks in the blockchain 216 that are relevant to the consumer user 380 through a smart contract. A consumer user 380 does not need to register with the blockchain network 212 in order for the block reviewing unit 392 to operate. However, in some embodiments, a consumer user 380 needs to register with the blockchain network 212 in order for the transaction generation unit 394 and the consumer review unit 396 to function or to deploy on the consumer user 380.

In some embodiments, the certificate authority 340 includes a computing system that includes a processing unit 342 and a certificate application 344. The certificate application functions to conduct a certification process or to communicate with the platform 320 and/or the blockchain network 212 in a certification operation. In an example embodiment, the certificate authority 340 may review a request for certificate automatically based on a smart contract stored in the blockchain 216, and may vote on a consensus process in the blockchain network 212. The relevant consensus algorithm may assign a separate status to the certificate authority 340 from other consensus nodes for the certification process. For example, the certificate authority 340, as a consensus node, may have a different tier of voting power from the rest of consensus nodes in the blockchain network 212.

The certificate application 344 includes software units including a qualification unit 346, a business registration unit 348, a consumer registration unit 350, a smart contract review unit 352 and a complaint processing unit 354.

The operations and functions of the software units of the system 300 are further described herein.

Figure 4:
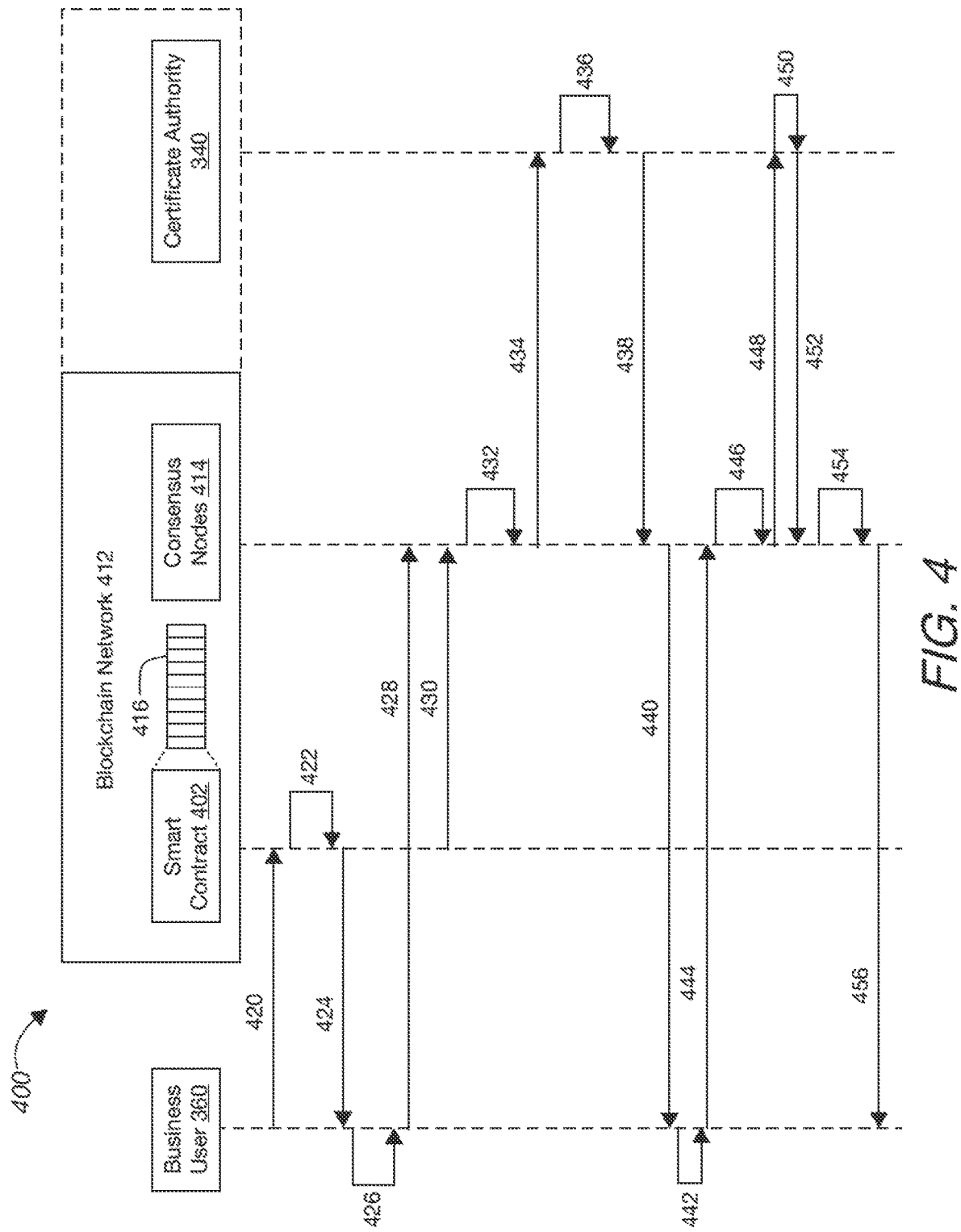
FIG. 4 shows an example process of registering a business user as a participant user in accordance with embodiments of this specification.

FIG. 4 shows an example process 400 of registering a business user 360 as a participant user. In some embodiments, the process 400 is implemented through a blockchain network 412 supported by the blockchain platform 320. A smart contract 402 is stored in a block or in a chain of blocks in a blockchain 416 maintained by the blockchain network 412; deployed on the blockchain network 412; or deployed on a separate middle layer beyond the blockchain network 412, which implements business logics separately from the data stored in the blockchain 416. The blockchain network 412 includes consensus nodes 414 that have a first tier of voting authorities. In some embodiments, the certificate authority 340 is a consensus node of the blockchain network 412 and has a same or a different voting authority from the consensus nodes 414. In some embodiments, the certificate authority 340 operates outside of the blockchain network 412 and communicates with the blockchain network 412 for the operations of the process 400.

In operation 420, a business user 360 inquiries about registration as a participant to the blockchain network 212 (FIG. 2) of logistic management. This inquiry triggers the smart contract retrieval unit 326 of the blockchain platform 320 to retrieve and/or execute the smart contract 402. The smart contract 402 governs the registration of a participant user. The user inquiry is conducted within a blockchain network supported by the blockchain platform 320 or is conducted outside of the blockchain platform 320.

In operation 422, the smart contract implementation unit 328 causes the smart contract 402 to execute. In some embodiments, the execution of the smart contract 402 may generate or identify a software module for implementing a business registration unit 368 at the business user 360. The execution of the smart contract 402 may also generate or identify a user qualification consensus algorithm, which in some embodiments is a part of the smart contract 402. The smart contract 402 may include a plurality of parts for different parts of a transaction(s) or may include one or more than one smart contracts governing different transactions.

In operation 424, the platform 320 provides a software module to the business user 360 for the business user 360 to install or deploy the business registration unit 368 as part of the business user application 366 on the user device.

In operation 426, the business registration unit 368 is executed to locally process required qualification information at the business user 360. In some embodiments, the required qualification information of a business user 360 is stipulated by the smart contract 402. The required qualification information may include business certificate, business license, revenue, income, number of employees, or other information of the business user 360. After having obtained the required information through the data sensing suite 364, the business registration unit 368 processes the information into a format that meet the requirements set up by the smart contract 402 and/or the requirements of the certificate authority 340 that is linked through the smart contract 402. The local processing of the qualification information is conducted by the business registration unit 368 in line with the requirements of the smart contract 402. Further, the consensus algorithm is embedded in the smart contract 402 such that the locally processed business user qualification information will automatically comply with the consensus algorithm. Such local processing of the qualification information allocates the data processing burden between the platform 320 and the business user 360, which saves computing resources at the platform 320 and helps to improve the data processing efficiency at the platform 320 and to reduce delays on the consensus process. The smart contract 402 links the local processing of the data at the business user 360 with the central processing of the data, e.g., the consensus process, at the blockchain network 212 and/or the blockchain platform 320.

After the qualification information of the business entity is locally processed, in operation 428, the business registration unit 368 sends the processed qualification information to the blockchain network 412.

In operation 430, the smart contract implementation unit 328 provides the consensus algorithm, as included in or identified by the smart contract 402, to the consensus nodes 414 of the blockchain network 412. It should be appreciated that the consensus algorithm may already be deployed on the consensus nodes 414 and is identified as applicable to the consensus process of registering the business user 360.

In operation 432, the consensus unit 330 of the platform 320 coordinates the consensus nodes 414 to each verify and validate the locally processed qualification information based on the consensus algorithm. If a consensus is concluded, the locally processed qualification information is batched into a block in the blockchain 416. In some embodiments, an identification of the smart contract 402 or the smart contract 402 itself may also be included in a same block as the verified qualification information. For example, in some embodiments, the consensus unit 330 may select one of the consensus nodes 414 to function as a mining node to include the qualification information into a proposed block to be verified by all the consensus nodes 414. In some embodiments, the consensus nodes 414 rotate to function as mining nodes to pick up such qualification information as a transaction and form a proposed block containing such qualification information. In some embodiments, such qualification information is picked up and mined into a proposed block by the platform 320 functioning as a node in the blockchain network 412. In some embodiments, the qualification information of a business entity is only stored in the platform 320 as an administrative node. In some embodiment, the contents of the qualification information may not be accessible to consensus nodes 414, instead only the submission of the qualification information to the blockchain network 412 is stored in the blockchain 416 as a transaction.

In operation 434, the verified qualification information is obtained by the certificate authority 340. In some embodiments, the verified qualification information is obtained by the certificate authority 340 directly through the blockchain 416. In some embodiments, the verified qualification information is sent to the certificate authority 340 through the network 110.

In operation 436, the qualification unit 346 of the certificate authority 340 reviews the verified qualification information. In some embodiments, the review of the verified qualification information is conducted in line with the smart contract 402. For example, the smart contract 402 provides criteria, e.g., rules and standards, for certificating a business user 360 to be a participant user of the blockchain network 212 for logistics management. As such, the reviewing of the verified qualification information may be conducted automatically on certificate authority 340. The smart contract 402 links the qualification information provided by the business user 360 and the review of such qualification information at the certificate authority 340, which greatly streamlines the reviewing process on the certificate authority 340. The smart contract 402 may also be constantly or dynamically updated and the updates can also be smoothly reflected in the business registration unit 368 and the qualification unit 346 in synchronized manner among the business user 360, the blockchain network 412 and the certificate authority 340.

In operation 438, a decision of the qualification review is returned to the blockchain network 412. In some embodiments, the review decision is stored into the blockchain 416 as a new transaction linked to the verified qualification information of the business user 360. For example, the review decision may include Approval, Rejection, or Correction. In some embodiments, reasons supporting the review decision may also be batched into the blockchain 416 as transactions for the business user 360 to access.

In the case that the qualification of the business user 360 is approved, in operation 440, the business user 360 is notified by the blockchain network 412 to start a registration process to become a participant user.

In operation 442, the business registration unit 368 of the business user application 366 obtains and locally processes registration information of the business entity 360 based on the requirements of the smart contract 402. For example, the local processing generates registration information in a format in compliance with the smart contract 402. As such, the generated registration information is linked to the consensus algorithm of the blockchain network 412 in verifying the registration information. As discussed herein, in some embodiments, the consensus algorithm is at least part of the smart contract 402. In some embodiments, the registration information includes proposed scope of business that the business user 360 operates in relation to the blockchain network 212. For example, the business user 360 may propose to add transaction information into the blockchain 216 only for transactions within the proposed scope of business.

In operation 444, the locally processed registration information is provided to the blockchain network 412.

In operation 446, optionally, the consensus unit 330 coordinates each consensus nodes 414 to verify and validate the registration information based on the consensus algorithm identified by or included in the smart contract 402. For example, a proposed block containing the registration information is distributed to each consensus node, pending verification by the consensus node through executing the consensus algorithm, e.g., the smart contract 402, on the registration information. When each consensus node validates the registration information and other transactions in the proposed block, the proposed block containing the verified registration information is hashed into the blockchain 416.

In operation 448, the validated registration information is obtained by the certificate authority 340.

In operation 450, the business registration unit 348 of the certificate authority 340 reviews the validated registration information and issues registration certificate. The registration certificate may include business scope information.

In operation 452, the registration certificate is returned to the blockchain network 412. In some embodiments, the registration certificate is batched into a block of the blockchain 416.

In operation 454, the account management unit 332 of the blockchain platform 320 opens an account for the business user 360. At least some of the account information is batched into a block of the blockchain 416. In some embodiments, the account information includes business scope, account certificate, account ID, private key and other information. The private key will not be stored in the blockchain 416 and will be kept secret by the user. The business user is required to use the private key to digitally sign a piece of transaction information proposed to the blockchain network 412. In some embodiments, the business scope information may include types of transactions or sections in a logistics process that the business entity 360 is allowed to do. The business scope information may also include sections of a logistic process that the business user 360 is allowed to add transaction information into the blockchain 216. For example, a manufacturing entity is allowed to purchase parts, assembly products, and ship products to a delivery service entity. A manufacturing entity may not be allowed to deliver a product directly to a consumer. The business scope of the business entity is determined with respect to the logistics management blockchain network 212. A business entity may have multiple accounts with a same blockchain network 212 or different blockchain networks 212 supported by the platform 320. The different accounts may include different business scopes, different account certificates and/ or different private keys.

In operation 456, the account information is provided to the business user 360 together with a software module for implementing the participation unit 370 on the business user 360. The participation unit 370, when executed by the PU 362, enables the business user 360 to function as a participant user of the blockchain network 212. The account information includes account certificate, account ID, private key, and/or certified business scope.

Figure 5:
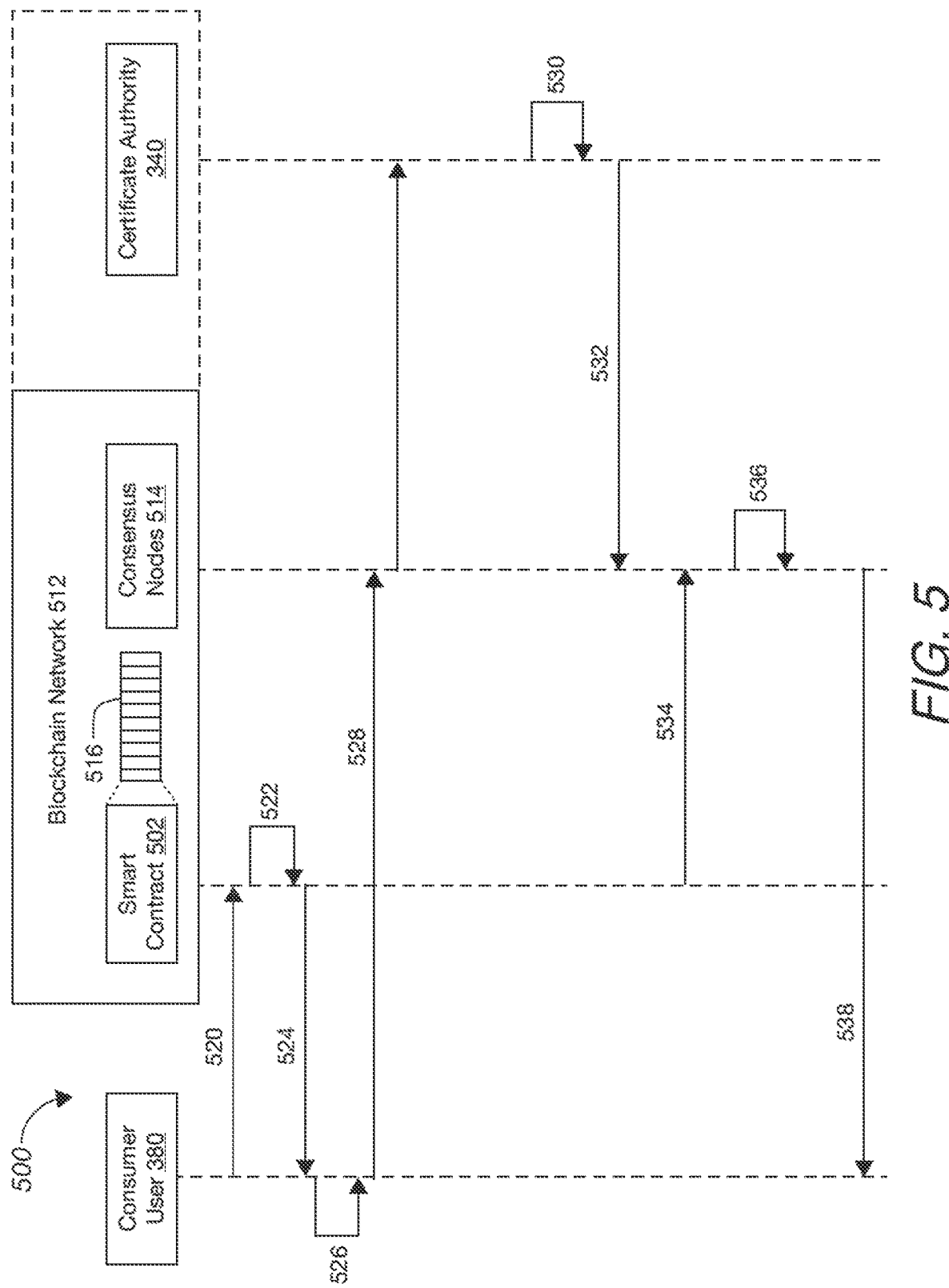
FIG. 5 shows an example process of registering a consumer user as a participant user in accordance with embodiments of this specification.

FIG. 5 shows an example process 500 of registering a consumer user 380 as a participant user. In some embodiments, the process 500 is implemented by a blockchain network 512 supported by the blockchain platform 320. The blockchain network 512 is a same network as the blockchain network 412 for business registration or is a different layer of network supported by the blockchain platform 320. The blockchain network 512 maintains a blockchain 516, where a smart contract 502 is stored in a block or in a chain of blocks in the blockchain 516 maintained by the blockchain network 512, deployed on the blockchain network 512, or deployed on a separate middle layer beyond the blockchain network 512, which implements business logics separated from the data stored in the blockchain 516. The blockchain network 512 includes consensus nodes 514 that each has a first tier of voting authorities. In some embodiments, the certificate authority 340 is a consensus node of the blockchain network 512 and has a same or a different voting authority from those of the consensus nodes 514. In some embodiments, the certificate authority 340 operates outside of the blockchain network 512 and communicates with the blockchain network 512 in the operations of the process 500.

In operation 520, a consumer user 380 inquiries about registration with the blockchain network 212 of logistic management. This inquiry triggers the smart contract retrieval unit 326 of the platform 320 to retrieve or identify the smart contract 502 as applicable. The smart contract 502 governs the registration of a consumer user 380 to be a participant user. The inquiry is conducted through the blockchain platform 320, a blockchain network supported by the blockchain platform 320, or the network 110 outside of a blockchain network.

In operation 522, the smart contract implementation unit 328 triggers the smart contract 502 to execute. The execution of the smart contract 502 generates or identifies a software module for deploying a consumer registration unit 388 at the consumer user 380. The execution of the smart contract 502 also includes or identifies a consumer qualification/registration consensus algorithm. The consumer qualification/registration consensus algorithm may provide that no consumer identification information is disclosed or made accessible to a consensus node 514 and/or the platform 320 in the registration process or in other operations of the blockchain network 212.

In operation 524, the platform 320 provides the software module of the consumer registration unit 388 to the consumer user 380 for the consumer user 380 to install or deploy the consumer registration unit 388 on a computing device of the consumer user 380 as a part of the consumer user application 386.

In operation 526, the consumer registration unit 388 is executed to locally process, at the consumer user 380, consumer registration information required by the smart contract 502. For example, personal identification of the consumer, personal identification documents or certificate, or other personal information of the consumer 380 may be required. Such personal information of the consumer 380 may not be made available to the blockchain platform 320 or the consensus nodes 514 and may be processed in a sufficiently secret manner locally with in consumer user 380. In some embodiments, the consumer registration unit 388 encrypts the personal information of the consumer to be sent to the certificate authority 340, directly or through the blockchain platform 320. In some embodiments, the consumer registration unit 388 pops up rules or agreement terms for the consumer to review and confirm. In some embodiments, the consumer's feedback to the rules or agreement terms is sent to the blockchain network 512 and is included in a block of the blockchain 516.

Such local processing of the consumer's personal or other information splits the data processing burden or costs between the blockchain platform 320 and the consumer user 380, which saves computing resources at the platform 320, improves the processing efficiency at the blockchain platform 320, and reduces delays on the pipeline of batching a transaction into a block pending for a consensus process. The local data processing is linked to the central data processing at the blockchain platform 320 through the smart contract 502, which enhances consistency and predictability in data processing.

In operation 528, the consumer registration unit 388 sends the locally processed and encrypted consumer registration information to the certificate authority 340, either directly or via the blockchain platform 320. In some embodiment, a first portion of the consumer registration information package is provided to the blockchain network 512 and stored in the blockchain 516. A second portion of the consumer registration information package is provided to the certificate authority 340 via the blockchain network 512. The second portion of the consumer registration information contains personal information of the consumer that is not accessible to the blockchain network 512 or the blockchain platform 320.

In operation 530, the consumer registration unit 350 of the certificate authority 340 reviews the consumer registration information. In some embodiments, the review is conducted based on requirements or information provided by the smart contract 502. Some of the consumer registration information, the personal information of the consumer, is only available to the certificate authority 340. The consumer registration unit 350 verifies that the personal information provided by the consumer user 380 is accurate. The consumer registration unit 350 also reviews the verified personal information with respect to the requirements or information provided by the smart contract 502 to determine whether the consumer is qualified to be registered as a participant user of the blockchain network 212. For example, the smart contract 502 may set up an age requirement for the purchase of some products or services. The age information of a consumer is not accessible to the blockchain platform 320 and is reviewed at the certificate authority 340.

In operation 532, a certification result is provided to the blockchain network 512.

In operation 534, the smart contract implementation unit 328 provides or identifies the consumer registration consensus algorithm to the consensus nodes 514 of the blockchain network 512 based on the smart contract 502. In some embodiments, the consumer registration consensus algorithm is part of the smart contract 502. It should be appreciated that the consumer registration consensus algorithm may be deployed or identified to the consensus nodes 514 any time before or during a consensus process 536 is performed.

In operation 536, the consensus unit 330 of the platform 320 coordinates the consensus nodes 514 to each verify and validate the consumer registration based the consumer registration consensus algorithm and based on the certification result provided by the certificate authority 340. Note that the first portion of the consumer registration information package has already been stored in the blockchain 516 and may be used in the consensus procedure. Upon a consensus being concluded, a consumer account is created. The account information can be stored in the blockchain 516, containing consumer account information of the consumer user 380. Note that the account information in the blockchain 516 does not include the personal information of the consumer that has been provided to the certificate authority in the second portion of the registration information package. The consumer account information may include a consumer account ID and/or other information. For example, the consumer's confirmation or acceptance of the rules on making consumer feedback to a logistic process may be included as part of the consumer account information stored in the blockchain 516. A private key is generated for the consumer account and is stored in another layer separated from the blockchain 516.

The consumer registration may be separated from the account management for a consumer. A consumer may open an account with the blockchain platform 320 to only access the transaction data stored in the blockchain 216 without the permission to propose transaction information to be added into the blockchain 216. For example, a consumer may have an account with the blockchain platform 320 to view the transaction information of a logistic process but may not be able to provide customer feedback or other inputs if the consumer is not registered through the process 500 of FIG. 5. The registration enables a consumer user 380 to join the blockchain network 212 as a participant user.

In operation 538, the consumer account information is provided to consumer user 380. In some embodiments, a software module for implementing the consumer participation unit 390 is deployed on the consumer user 380. The consumer participation unit 390, when executed by the PU 382, enables the consumer user 380 to function as a participant user of the blockchain network 212.

Figure 6:
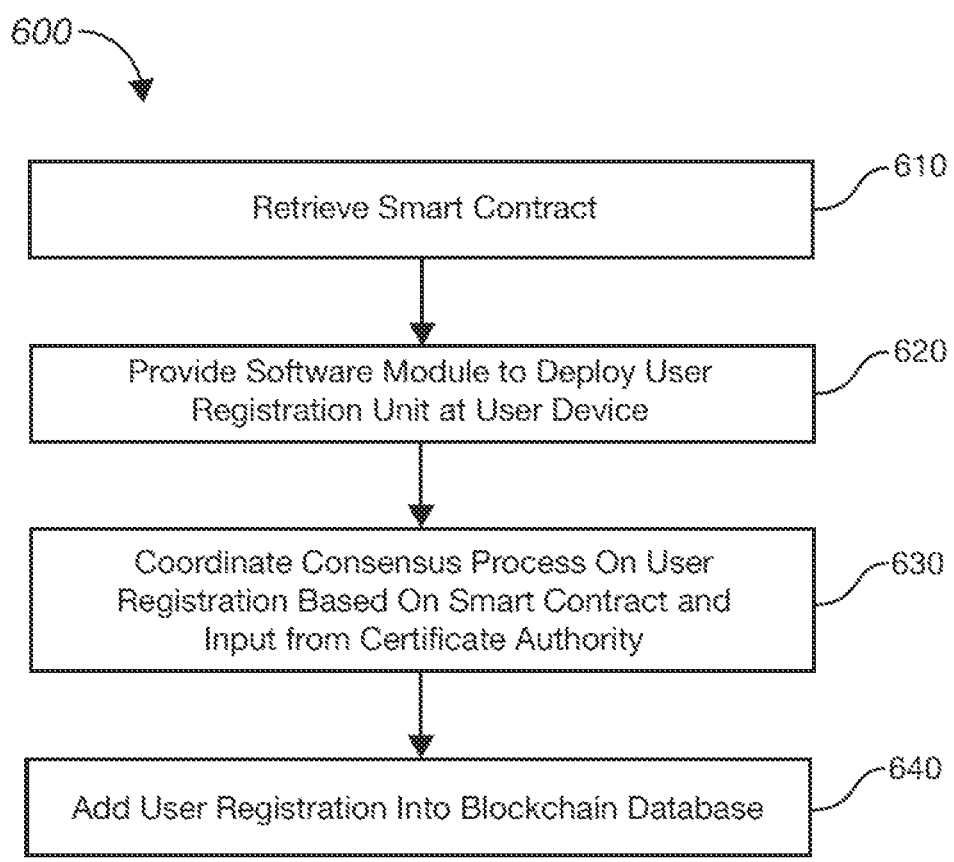
FIG. 6 is an example flow chart of a method for implementing the example processes of FIG. 4 or 5 or other processes in accordance with embodiments of this specification.

FIG. 6 is an example flow chart of a method 600 for implementing the processes 400, 500 or other processes. For convenience, the acts of the method 600 are described as being performed by a server computer supporting the blockchain platform 320 and/or the blockchain networks 412, 512. However, the method 600 may be implemented with other computing systems and in other environments.

In act 610, the smart contract retrieval unit 326 of the blockchain platform 320 retrieves a smart contract 402, 502 based on a request for registration from a user. In some embodiments, the smart contract retrieval is triggered by the event that a request for registration is received from a user. In some embodiments, the smart contract 402, 502 is retrieved from a blockchain 416, 516. In some embodiments, the smart contracts 402, 502 are already deployed on the blockchain network, e.g., the consensus nodes of the blockchain network or the blockchain platform 320, and the act of smart contract retrieval identifies the smart contracts 402, 502 as applicable to the received user registration request. For different types of user registrations, the smart contract retrieval unit 326 may retrieve different smart contracts 402, 502. Each smart contract 402, 502 stipulates user registration requirements and a consensus algorithm for verifying and validating the user registration. In some embodiments, a smart contract 402, 502 also generates or identifies a user software module for locally processing data package for user registration on a user terminal.

In act 620, the smart contract implementation unit 328 makes the user software module available to the user device for installation or deployment onto the user device. The software module is dedicated to deploy a user registration unit 368, 388 on the user computing device, which enables the user computing device to locally process user registration information and to communicate the processed user registration information to the platform 320 or a certificate authority 340 that is separated from the platform 320. The communication to the certificate authority 340 may be effected through the platform 320.

In act 630, the consensus unit 330 coordinates with consensus nodes 414, 514 of a blockchain network 412, 512 in a consensus process to verify and validate registration of the user under the consensus algorithm as included in or identified by the smart contract 402, 502 and based on an input from the certificate authority 340 on the user registration information.

In act 640, upon a consensus is concluded on the request for registration, the user registration account is added into the blockchain database 416, 516. The batched user registration account information includes a user ID, a business scope of a business user 360 in which the business user 360 is authorized to propose transaction data into a blockchain. A private key is generated for the registered user, which is stored in a different layer separated from user registration account information. A registered user 360, 380 becomes a participant user of a blockchain network 212, which may or may not be the same blockchain network 412, 512 that operates the user registration.

Figure 7:
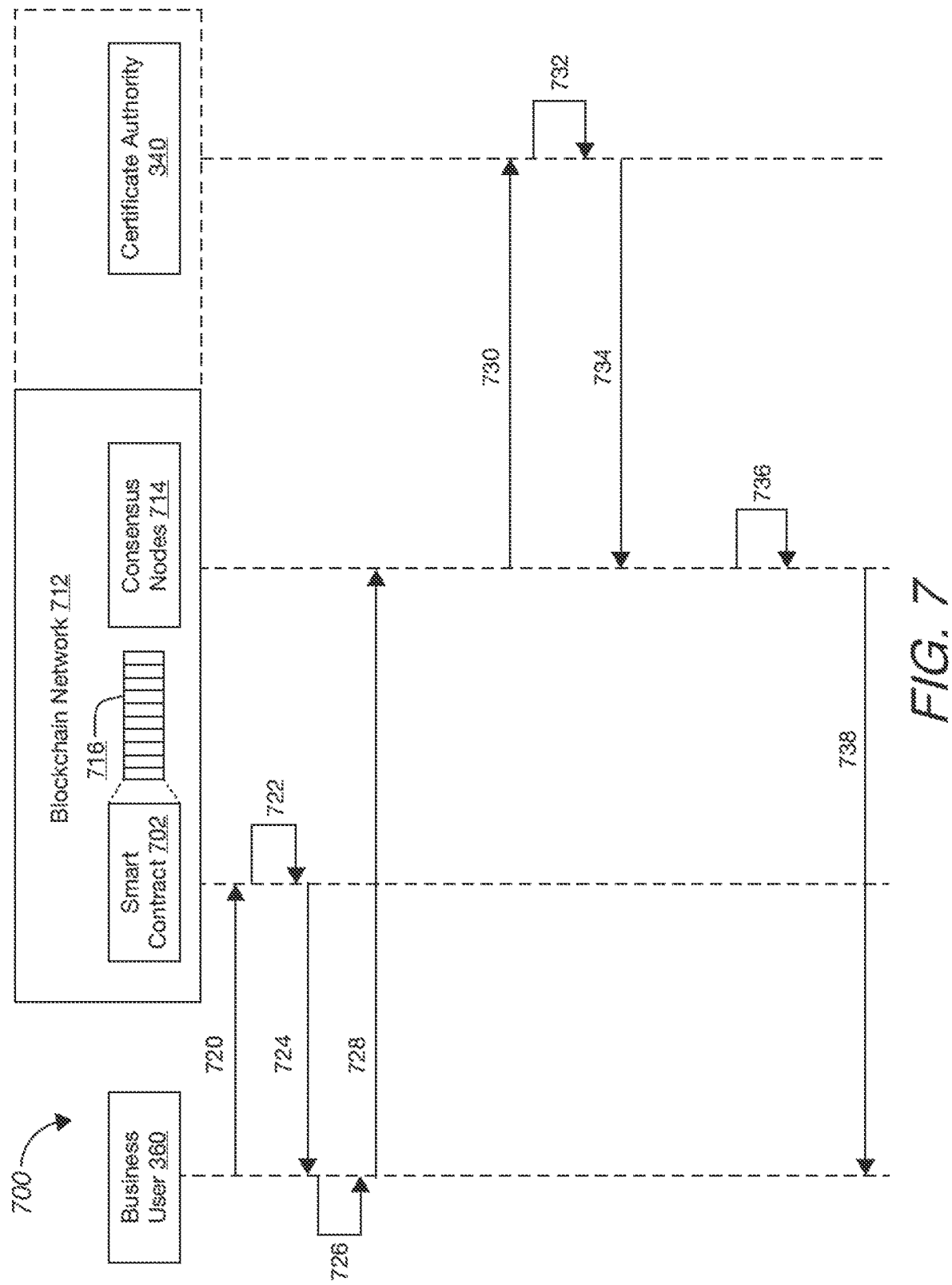
FIG. 7 is an example process for registering a smart contract governing a logistic process in accordance with embodiments of this specification.

FIG. 7 is an example process 700 for registering a smart contract governing a logistic process. The logistic process itself occurs outside the logistics management blockchain network 212 and may use the blockchain 216 to store transaction data on the events of the logistic process such that the logistic transactions that occur in the logistic process are tracked through the blockchain network 212. In some embodiments, a smart contract ("logistics management smart contract") governs how the logistic transactions are added into the blockchain 216 for tracking the logistic process. The example process 700 can be used to register such a logistics management smart contract with a blockchain network 712.

In some embodiments, the process 700 is implemented through a blockchain network 712 supported by the blockchain platform 320. The blockchain network 712 may be a same network as the blockchain network 212 for logistics management or may be a different layer of network supported by the platform 320. A smart contract 702 is deployed on the blockchain network 712 and governs the process of registering a logistics management smart contract that is different from the smart contract 702. The deployment of the smart contract 702 may be implemented in various ways, which are all included in the scope of the disclosure. For example, the smart contract 702 may be stored in a block or a chain of blocks in the blockchain 716 maintained by the blockchain network 712; the smart contract 702 may be deployed on each consensus nodes 714 of the blockchain network 712; or the smart contract 702 may be deployed on a middle layer beyond the blockchain network 712 which governs the operation logics of the blockchain network 712. The blockchain network 712 includes consensus nodes 714 that each has a first tier of voting authorities. In some embodiments, the certificate authority 340 is a consensus node of the blockchain network 712 and has a same or a different tier of voting authority from those of the consensus nodes 714. In some embodiments, the certificate authority 340 may operate outside of the blockchain network 712 and communicates with the blockchain network 712 in the operations of the process 700 via the network 110.

In operation 720, the smart contract unit 372 of the participation unit 370 of a registered business user 360 inquiries about registration with the blockchain network 712 a smart contract governing a logistic process involving the business user 360. This inquiry triggers that the smart contract retrieval unit 326 of the blockchain platform 320 retrieves the smart contract 702 as applicable to the process. Depending on the various deployment manners, the retrieval act may actually retrieve the smart contract 702 from the blockchain 716 or may identify the smart contract 702 as applicable to the process triggered by the user inquiry. The smart contract 702 governs registration of a logistics management smart contract for a logistic process. Different smart contracts 702 may be retrieved for different types of logistic processes as inquired by the smart contract unit 372 of the business user 360.

In some embodiments, only a registered business user 360, e.g., a participant user, is permissioned to register a smart contract, e.g., a logistics management smart contract.

For example, a registered brand owner business user 360 may inquire about registering a smart contract on tracking a logistic process of a sale of a brand name product to a consumer 380. The logistic process may include a series of transactions like, e.g., a consumer placing an order to purchase the brand name product, the brand owner confirming the order, the brand owner placing an OEM order to purchase the brand name product from an OEM manufacturer, the OEM manufacturer confirming the OEM order, the OEM manufacturer making the brand name product, the OEM manufacturing delivering the brand name product to a transportation carrier, the transportation carrier accepting the delivery, the transportation carrier shipping the band name product, the transportation carrier delivering the brand name product to the consumer, the consumer accepting the delivery by the transportation carrier, and the consumer reviewing the product or services in the logistic process. The contents of a proposed smart contract or the corresponding logistic process are initially determined by the business user 360.

In operation 722, the smart contract implementation unit 328 causes the smart contract 702 to execute. The execution of the smart contract 702 generates or identifies a set of requirements that the proposed smart contract needs to meet. For example, it may be required that the proposed smart contract include a consumer feedback section on one or more of the series of transactions of the logistic process. For example, the smart contract 702 may stipulate details on allowing or enabling a consumer to provide consumer feedback to a transaction in the logistic process. The smart contract 702 may stipulate details regarding how a consumer provides feedback on logistic transactions and how the consumer feedback is processed on the blockchain network 212, the blockchain platform 320, or the certificate authority 340.

In some embodiments, the smart contract 702 may require that the proposed logistic process be subdivided into a series of sequential or concurrent sections. Each of the sections is identified by a section ID. The smart contract 702 may also require that each of the sections be linked to specific participant users or specific qualifications of a participant user that are allowed to conduct transactions in the section. In some embodiments, the qualifications are related to the registered business scopes of business users 360.

The execution of the smart contract 702 may also generate or identify a smart contract registration consensus algorithm for the consensus nodes 714 to follow in verifying and validating a proposed smart contract. The contract registration consensus algorithm may provide that some details of the logistic process be not available to the consensus nodes 714 in the consensus process and may only be provided to the certificate authority 340 for review and approval. This requirement helps to protect the confidential commercial information of the business user 360 in the logistic process that the proposed smart contract governs. The consensus process by the consensus nodes 714 is conducted based on inputs from the certificate authority 340 upon a certification process being completed on the certificate authority 340 with respect to the proposed smart contract.

In operation 724, the requirements of the proposed smart contract are identified or provided to the business user 360. In some embodiments, the requirements are provided as a plug-in program module to function on the smart contract unit 372. In another embodiment, the requirements are already included in the smart contract unit 372 and the execution of the smart contracts 702 automatically identifies the requirements as applicable to the specific type of logistic process as proposed by the business user 360.

In operation 726, the smart contract unit 372 of the participation unit 370 generates a proposed logistics management smart contract based on the requirements identified by the smart contract 702. The proposed logistics management smart contract may include a sequential order of a plurality of sections in the sale of the brand name product. For example, the proposed logistics management smart contract may assign a section ID for each of the sections of establishing an agreement, placing an order for a final product, purchasing a part, delivering a part, assembling the final product, inspecting and testing the final product, shipping the final product, delivering the final product to a consumer, consumer accepting delivery, consumer making payment, customer service, consumer review, or other activities/transactions. Each of those sections of the sale of goods logistic process is identified as to be conducted by one or more business users 360 and/or one or more consumer users 340. The proposed logistics management smart contract may include identified participant users 214 for each of the sections. The proposed logistics management smart contract may include required qualifications or business scopes of the participant users 214 for participating in each of the sections. For example, the proposed logistics management smart contract may stipulate that only identified OEM manufacturers are allowed to manufacture the brand name product. The proposed logistics management smart contract may include qualification requirements on participant users 214 to conduct identified transactions in a section. For example, logistics management smart contract may require that only registered consumer users 360 are allowed to provide comments on the logistic transactions.

The proposed logistics management smart contract may also specify how the transaction information is batched into proposed blocks to be hashed into the blockchain 216. For example, the brand owner may require that the real identity of the OEM manufacturer be kept confidential from the consumers. The proposed logistics management smart contract may also link a type of transaction data to be batched into the blockchain 216 to a permissioned source of such types of transaction data. For example, a transportation carrier may obtain from an OEM manufacturer an estimated delivery date that a brand name product is delivered from the OEM manufacturer to the transportation carrier. However, the transportation carrier may not be permissioned to propose such delivery date information to be added into the blockchain 216, and the OEM manufacturer is the only participant user that is permissioned to propose such transaction information to be added into the blockchain 216. A consumer is allowed to propose consumer review information on a product or information on the delivery of the product to the consumer. A consumer may not be allowed to propose consumer review on the delivery of the product from the OEM manufacturer to the transportation carrier, although the consumer is allowed to access or view such transaction information as stored in the blockchain 216 through the block reviewing unit 392.

In some embodiments, the proposed logistics management smart contract is generated locally based on the requirements set up by the smart contract 702. For example, a format of the proposed logistics management smart contract is required to meet the requirements set up by the smart contract 702. The proposed smart contract, as locally generated by the smart contract unit 372, is ready to be reviewed by the consensus nodes 714 and/or the certificate authority 340. Such local processing in generating the proposed logistics management smart contract splits the computing and data processing costs between the blockchain platform 320 and the business user 360, which saves computing resources at the platform 320, improves the processing efficiency at the platform 320, and reduces delays on concluding a consensus. In some embodiments, the locally generated proposed logistics management smart contract is already coded as a computer program using Solidity or other computer languages. In some embodiments, the terms or provisions of the proposed logistics management smart contract are generated locally, while the computer program of the proposed logistics management smart contract is generated on the platform 320 after the terms or provisions of the proposed logistics management smart contract have been approved and/or certified.

In operation 728, the smart contract unit 372 sends the proposed logistics management smart contract to the blockchain network 712 or the blockchain platform 320.

In operation 730, the blockchain network 712 or the blockchain platform 320 provides the proposed logistics management smart contract to the certificate authority 340 for review. Depending on the specific logistic process covered by the proposed logistics management smart contract, some of the logistics management smart contract may not need to be reviewed and certified by the certificate authority 340.

In operation 732, the smart contract review unit 352 of the certificate authority 340 reviews the proposed logistics management smart contract. In some embodiments, the smart contract review unit 352 reviews the proposed smart contract based on criteria, e.g., rules or provisions, provided by the smart contract 702. With the rules or provisions identified by the smart contract 702, the review of the proposed logistics management smart contract is conducted more automatically and efficiently. In some embodiments, the smart contract 702 provides rules to determine whether the terms of the proposed logistics management smart contract are reasonable and feasible for the proposed logistic process.

In operation 734, the certification result on the proposed logistics management smart contract is returned to the blockchain network 712.

In operation 736, the consensus unit 330 of the blockchain platform 320 coordinates the consensus nodes 714 to each verify and validate the proposed logistics management smart contract based the contract registration consensus algorithm and the inputs from the certificate authority. The contract registration consensus algorithm is a part of the smart contract 702 or is identified by the smart contract 702. Upon consensus being concluded, a block containing the proposed logistics management smart contract is added into the blockchain 716. In some embodiments, the logistics management smart contract is accessible to the participant users 214 of the blockchain network 212, while logistics management may only be executed when preset conditions are met. For example, the smart contract on sale of a brand name product may only be executed upon a purchase order between the brand name owner and a consumer is established, citing the logistics management smart contract. A smart contract ID is assigned to the stored logistics management smart contract.

In operation 738, the smart contract ID is provided to the registered business user 360 that proposes the logistics management smart contract.

Figure 8:
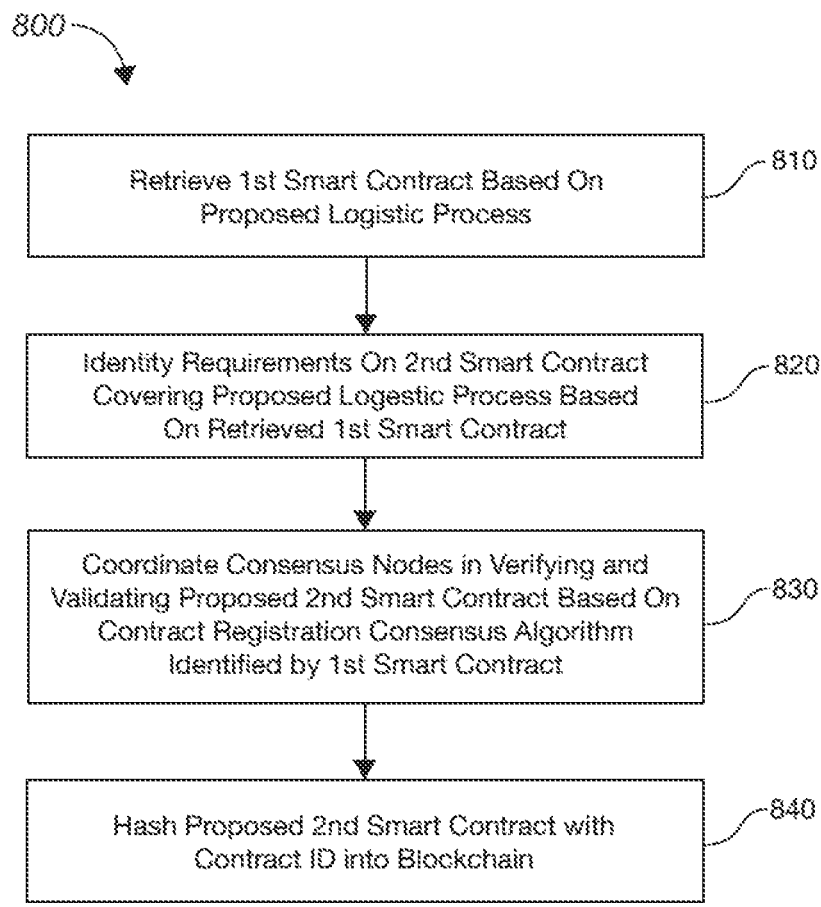
FIG. 8 is an example flow chart of a method for implementing the process or other processes in accordance with embodiments of this specification.

FIG. 8 is an example flow chart of a method 800 for implementing the process 700 or other processes. For illustration, the acts of the method 800 are described as being performed by a server computer supporting the blockchain platform 320 and/or the blockchain network 712. However, the method 800 may be implemented with other computing systems and in other environments.

In act 810, the smart contract retrieval unit 326 of the blockchain platform 320 retrieves a smart contract 702 based on a request for registering a logistics management smart contract for a logistic process from a business user 360. In some embodiments, the proposed smart contract is dedicated for a logistic process. In some embodiments, the smart contract 702 is retrieved from a blockchain 716. In some embodiments, the act of retrieving the smart contract 702 identifies a smart contract 702 deployed on the consensus nodes 714 and/or the platform 320. For different types of logistic processes, the smart contract retrieval unit 326 may retrieve different smart contracts 702. Each smart contract 702 (first smart contract) stipulates requirements on registering a proposed smart contract (second smart contract) and a contract registration consensus algorithm for verifying and validating the proposed smart contract before the proposed smart contract is registered and stored in the blockchain 716.

In act 820, the platform 320 identifies to the business user 360 the requirements on registering the proposed smart contract with the blockchain 712.

In act 830, the consensus unit 330 coordinates with consensus nodes 714 of the blockchain network 712 to verify and validate a proposed second smart contract based on the contract registration consensus algorithm as included in or identified by the smart contract 702 (first smart contract). In some embodiment, the proposed second smart contract is locally generated at the computing device of a business user 360 based on the requirements identified to it. In some embodiments, the consensus process is also conducted based on a certification input from the certificate authority 340 on the proposed smart contract.

In act 840, upon a consensus is concluded on the proposed smart contract, the contract management unit 334 of the blockchain platform 320 causes the proposed second smart contract be stored in the blockchain 216 with a contract ID. The stored second smart contract may stipulate a plurality of sections in a corresponding logistic process, identifications IDs for each of the sections, qualification requirements for participant users 214 to participate in each section, or other terms on the corresponding logistic process. In some embodiments, the stored second smart contract is cited or updated, e.g., through another transaction being added to the logistics management blockchain 216, when a specific logistic process is established under the stored smart contract. For example, when a sales agreement is established between a consumer and a business user 360, the second smart contract is updated to reflect the specific sales agreement and the updated second smart contract is stored in the logistics management blockchain 216 upon a consensus procedure be successfully completed. In the updated second smart contract, for example, the participant users 214 involved or allowed to be involved in the logistic process of the sales agreement are further determined or defined based on the terms of the sales agreement. For example, an updated second smart contract may specify that OEM manufacturers A, B, and C are qualified to manufacture the OEM product. The updated second smart contract may specify that manufacturer B is the manufacturer for the OEM product for the relevant sales agreement and the logistic process under the sales agreement. In some embodiments, the updating of the stored second smart contract is also governed by the smart contract 702.

Figure 9:
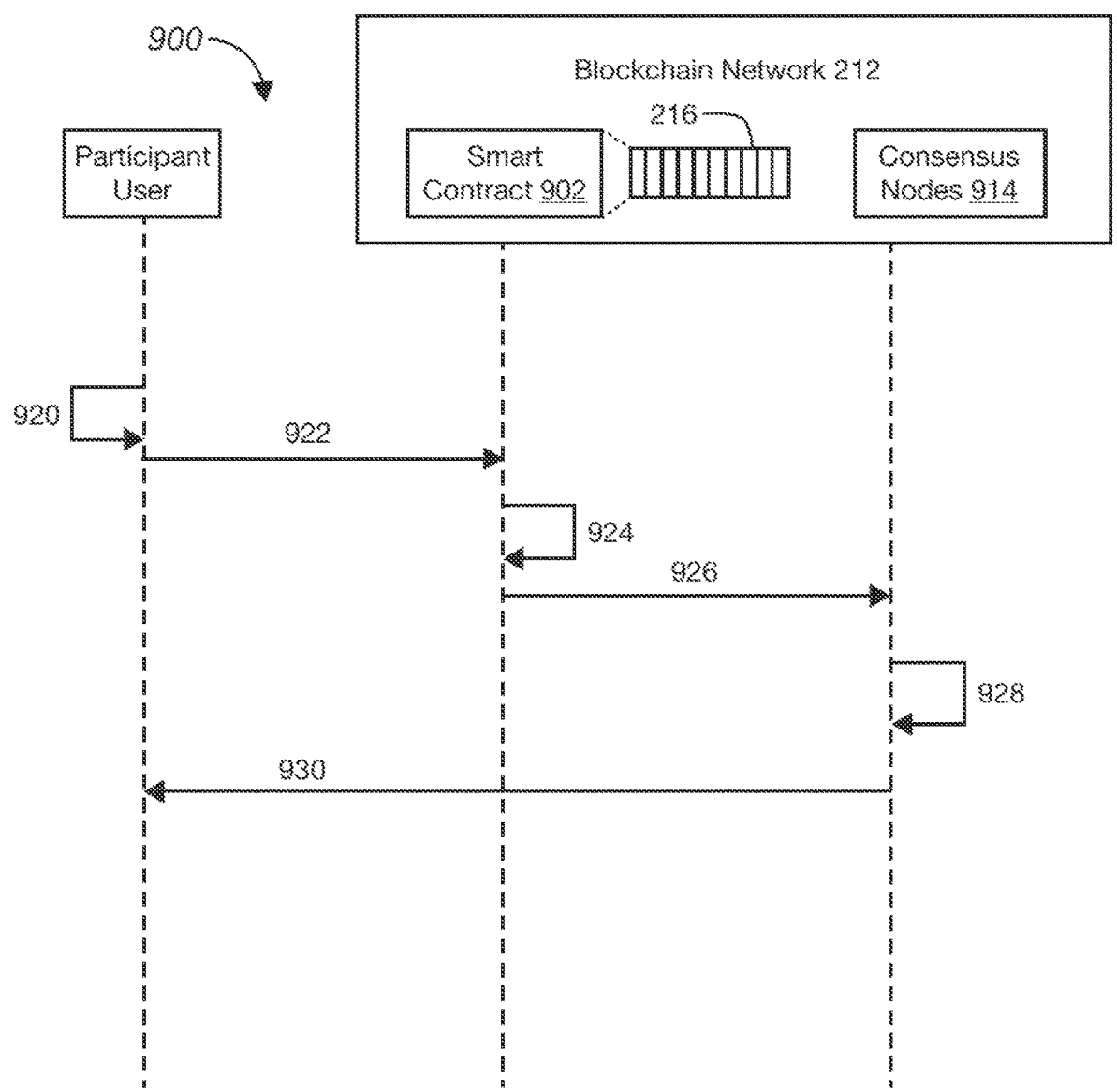
FIG. 9 is an example process of batching transaction information into a blockchain for tracking a logistic process in accordance with embodiments of this specification.

FIG. 9 is an example process of adding transaction information into a blockchain for tracking a logistic process. For illustrative purposes, a sale of a product is used as an example of the logistic process. The logistic process occurs outside the blockchain network 212. The blockchain 216 is used to track transactions in the logistic process. A smart contract 902 that is registered via the process 700 is applicable to the logistic process and governs that a logistic transaction is added into the blockchain 216.

In some embodiments, the participant users 214 of the blockchain network 212 all serve as consensus nodes 914 for verifying and validating a block to be batched into blockchain 216. In another embodiment, only some of the participant users 214 have the qualifications to serve as the consensus nodes 914 based on the respective registration process 400, 500. In some embodiments, at least some of the consensus nodes 914 are not participant users 214, and the consensus nodes 914 form a different layer of network from that of the participant users 214.

In some embodiments, the blockchain platform 320 also joins the blockchain network 212 as a consensus node 914 and/or as an administrative node. In some embodiments, a registered consumer user 380 also joins the blockchain network 212 for a logistic process involving the registered user 380 as a consumer. Other arrangements of the blockchain network 212 are also possible for the logistic processes, which are also within the scope of the disclosure.

In operation 920, the Transaction generation unit 374 of the participation unit 370 of a participant user generates a piece of transaction information on a logistic transaction related to a section of a logistic process. The generated transaction information includes smart contract ID of the logistic process and the section ID of the section in the logistic process. The participant user may be a registered business user 360 or a registered consumer user 380.

In some embodiments, the transaction generation unit 374 causes the smart contract 902 to execute or communicates with the smart contract 902 such that the transaction information is generated the based on the requirements of the smart contract 902. In some embodiments, the generated transaction information contains an ID of the smart contract 902 that governs the product sales logistic process, an ID of the corresponding section, and an ID of the participant user.

In some embodiments, the transaction generation unit 374 obtains the relevant transaction information directly from the data sensing suite 364. The data sensing suite 364 obtains the transaction information automatically in an IOT environment. For example, in an IOT environment of a transportation carrier, an RFID sensor is attached to a package of a product and/or the product itself. The location of the product is then constantly tracked through the RFID. The tracked location information is obtained automatically by the transaction generation unit 374 to generate a piece of proposed transaction information containing location information of the product in the transportation section of the logistic process.

In operation 922, the transaction generation unit 374 sends the generated transaction information to the blockchain network 212, proposing to add the transaction information into the blockchain 216. The proposed transaction information is digitally signed by the participant user using the private key of the registration account. In some embodiments, a piece of newly proposed transaction information shall not contradict or deviate from the existing transaction history as stored in the blockchain 216. For example, a participant user at the transportation carrier section of the product sales logistic process may not propose a transaction of accepting delivery of product from an OEM manufacturer while the OEM manufacturer has not proposed a transaction of shipping the product to the transportation carrier.

In operation 924, the smart contract retrieval unit 326 retrieves the applicable smart contract 902 based on the smart contract ID contained in the proposed transaction. The smart contract implementation unit 328 causes the smart contract 902 to execute. The execution of the smart contract 902 may generate a logistic transaction consensus algorithm for the consensus nodes 914 to follow in verifying and validating the proposed transaction as containing transaction information for the section in the logistic process. For example, under the logistic transaction consensus algorithm, a block of transaction information is verified with respect to the content of the transaction, the section ID of transaction, and the account ID of the participant 214. In some embodiments, the logistic transaction consensus algorithm is part of the smart contract 902.

In operation 926, the proposed transaction information and the logistic transaction consensus algorithm are each provided to the consensus nodes 914. In some example embodiments, the proposed transaction is queued to be included into a proposed block, among other proposed transactions in the proposed block, by one of the consensus node 914 functioning as a mining node. The proposed block is distributed across all the consensus nodes 914 for the consensus procedure.

In operation 928, the consensus unit 330 coordinates the consensus node 914 to verify and validate the proposed transaction based on the logistic transaction consensus algorithm. In some embodiments, each of the consensus nodes 914 will execute the identified logistic transaction consensus algorithm to verify the proposed transaction information on the logistic process, among all other transactions in the proposed block. After all the proposed transactions in the proposed block, including the proposed transaction information on the logistic process, have been verified and validated by the consensus nodes 914, the proposed block is added to the blockchain 216.

In some embodiments, for the proposed transaction information on the logistic process, the consensus nodes 914 each verifies and validates the content of the transaction, the section ID, and the account ID as contained in the proposed transaction information. For example, the consensus nodes 914 may verify whether the proposed logistic transaction information relates to the logistic process as identified by the smart contract ID or whether the logistic transaction information is consistent with the existing transaction information of the same logistic process. For example, transaction information related to a request for technology export control license may not be relevant to a sale of brand name garment product. For another example, transaction information of a transportation carrier accepting delivery of goods may be inconsistent with an existing piece of transaction information indicating the goods have been lost in transit.

The consensus nodes 914 may also verify that the section ID contained in the proposed transaction is a valid section ID and is consistent with the transaction information. For example, a transaction of completing assembly of a product is not consistent with a section ID of delivering a final product to consumer.

The consensus nodes 914 may also verify that the proposed transaction information contains a valid account ID and that the valid account ID is an allowed participant user for the section (section ID) of the logistic process. For example, if the business scope of the account ID does not comply with the participant qualification requirements of the smart contract 902 on a specific section of the logistic process, the proposed transaction will not be validated.

The consensus nodes 914 may also verify the proposed transaction based on other rules and standards set up by the logistic transaction consensus algorithm. The logistic transaction consensus algorithm complies with the consensus protocol of the blockchain network 212, and is generated, identified or linked by the smart contract 902. With the a proposed transaction and the consensus algorithm both being linked to the smart contract 902, the verification and validation of a proposed transaction is conducted more automatically and more efficiently, which improves the efficiency and user experience with the blockchain network 212 and the blockchain 216.

When consensus is concluded on the proposed block containing the proposed transaction information, the proposed block is hashed into the blockchain 216. A notification of the successful hashing is sent to the participant 214, in operation 930.

It should be appreciated that the process 900 of FIG. 9 is applicable to both a business user 360 and a registered consumer user 380. A registered user 380 may also be qualified for conduct transaction in some sections of a logistic process. For example, for a product sale logistic process, a consumer participant 380 can propose transaction information related to delivery of goods being accepted by the consumer, reviews on delivered goods, comments on delivery service, comments on overall purchase experience, etc. All those transactions are assigned to one or more section IDs in the logistic process.

Figure 10:
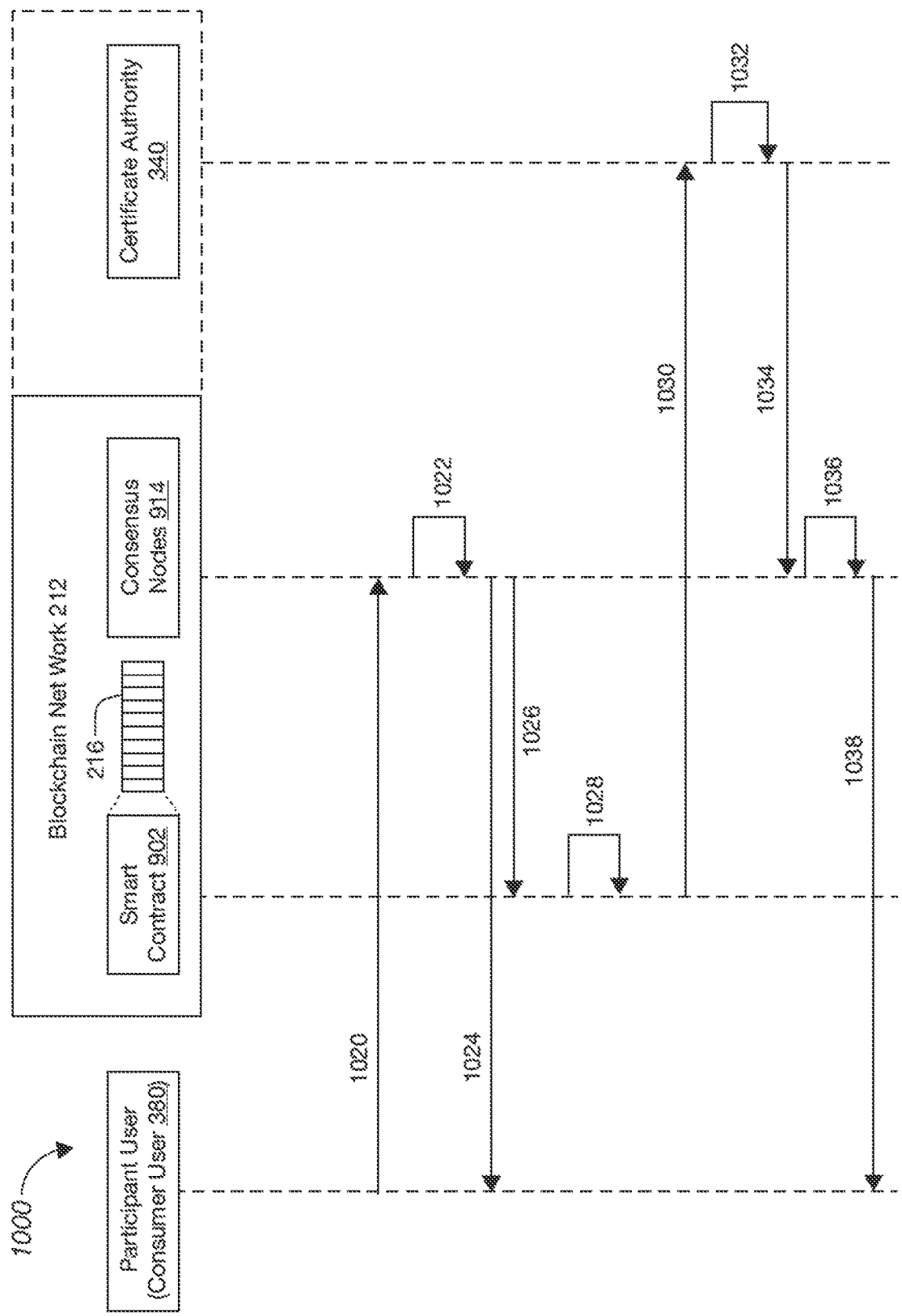
FIG. 10 is an example process for processing user feedback based on the smart contract in accordance with embodiments of this specification.

FIG. 10 is an example process for processing user feedback based on the smart contract 902. In operation 1020, a registered consumer user 380, functioning as a participant user, proposes a consumer comment on another participant user, e.g., a business user 360, in a logistic process governed by the smart contract 902.

In operation 1022, the proposed consumer comment is verified and added into the blockchain 216.

In operation 1024, a notification is returned to the consumer user 380 regarding the consumer comment being added into the blockchain 216.

In some embodiments, details of the operations 1020, 1022, 1024 are similar to the process 900 of FIG. 9. In some embodiments, a consumer comment need to include an ID of a participant user that the comment targets. In some embodiments, a section ID is also required for the target participant user or the target transaction.

In operation 1026, the consumer comments as stored in the blockchain 216 are linked to the respective smart contract 902. In some embodiments, this linking is conducted automatically through the smart contract ID included in the comments.

In operation 1028, the consumer comment unit 329 of the smart contract implementation unit 328 executes the smart contract 902 to analyze the consumer comments based on categorizations of the consumer comments and the target participant users in the consumer comment. In some embodiments, the consumer comments are categorized into "good review/compliment" or "bad review/complaint". In some embodiments, bad reviews on a same target participant user, from a same consumer user 380 or different consumer users 380, are accumulated. Good reviews on a same target participant user, from a same consumer user 380 or different consumer users 380, may also be accumulated. Reviews from a same registered consumer user 380, on a same target participant user or different participant users, may also be analyzed.

In some embodiments, mechanisms or approaches of analyzing consumer comments are included in the smart contract 902 and are agreed upon by the participant users involved in the respective logistic process.

In operation 1030, when the accumulated number of bad reviews on a target participant user reaches a threshold value, an account cancellation procedure is triggered. The account management unit 332 of the blockchain platform 320 sends the accumulated consumer comments, in a format stipulated by the smart contract 902 or other formats, to the certificate authority 340 for review.

In operation 1032, the complaint processing unit 354 of the certificate authority 340 reviews the consumer complaints and makes a decision.

In operation 1034, the certificate authority sends the decision of the complaint processing unit 354 back to the platform 320 or the blockchain network 212.

In operation 1036, the account management unit 332 manages the certificate account of the target participant user based on the inputs from the certificate authority 340. The account management actions may include suspension of the certificate account, revocation of the certificate account or downgrading the certificate account of the target participant user.

In operation 1038, results of some account management actions on a target participant user may be communicated to the consumer users 380 as feedback to the consumer complaints on the target participant user. Note that in such communications, confidential information or privacy information of the target participant user is protected.

Figure 11:
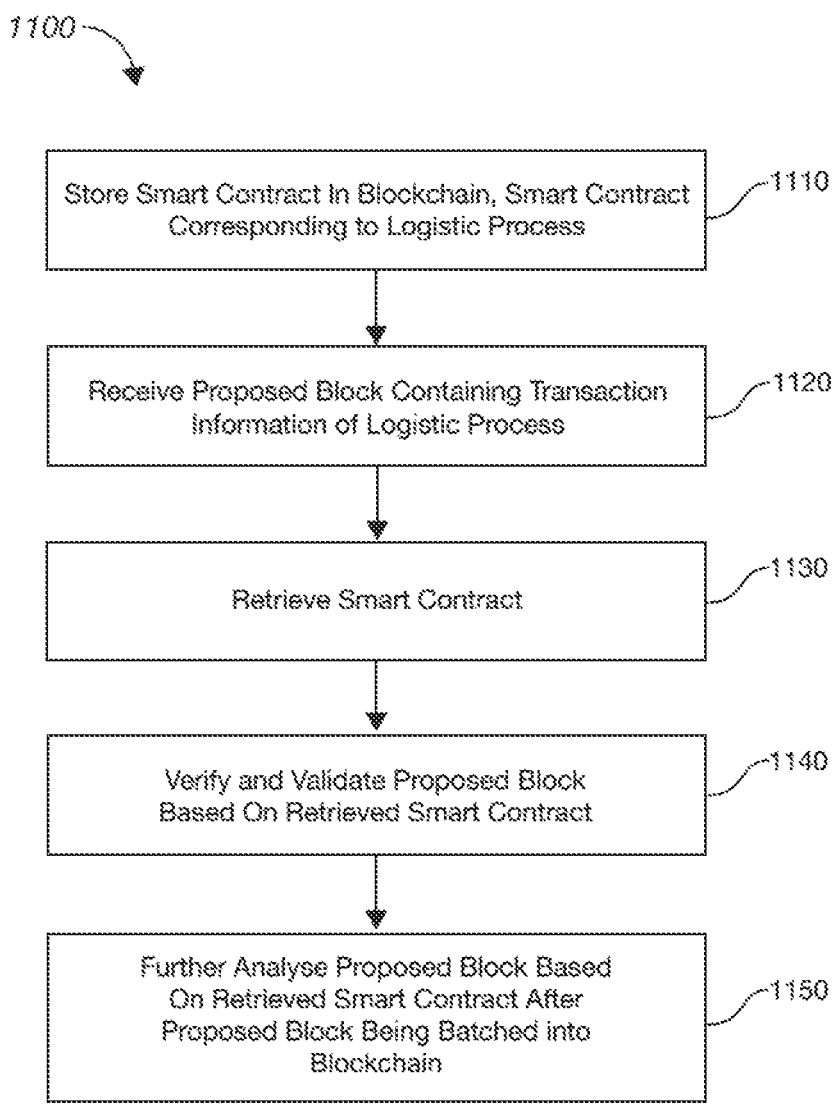
FIG. 11 is a flow chart of a method that can be used to implement the processes of FIG. 9 or 10 or other processes in accordance with embodiments of this specification.

FIG. 11 is a flow chart of a method 1100 that can be used to implement the processes 900, 1000 or other processes. The method 1100 is described with respect to the blockchain platform 320 for illustrative purposes only. It should be appreciated that the method 1100 may be similarly implemented by other entities.

In act 1110, a smart contract is stored in a blockchain. The smart contract corresponds to a logistic process that includes a plurality of sections.

In act 1120, a proposed transaction containing a set of information with respect to the logistic process is received by a blockchain network from a participant user of the blockchain network. The proposed transaction, upon queuing, is then included in a proposed block by a mining node of the blockchain network. The proposed transaction is proposed to be added into the blockchain for the logistic process. The logistic process corresponds to the stored smart contract. The proposed transaction is generated locally at the participant user based on requirements of the stored smart contract. In some embodiments, the proposed transaction contains an account identification of the participant user, a section identifier of a section of the logistic process, and an identification of the smart contract. The proposed transaction also includes transaction content that occurs in the section of the logistic process. The proposed transaction is digitally signed by the participant user using a private key assigned to the participant user.

In act 1130, the smart contract is retrieved from the blockchain based on the smart contract identification contained in the proposed transaction.

In act 1140, the proposed transaction is verified and validated by consensus nodes of the blockchain network based on the retrieved smart contract. When a consensus is concluded, a block containing the proposed transaction and other verified transactions is hashed into the blockchain for tracking the logistic process.

In act 1150, the transaction, as stored in the blockchain, is further analyzed based on the smart contract. For example, batched consumer complaints on a target participant user are analyzed to evaluate whether an account management action is conducted upon the certificate account of the target participant user.

The system, apparatus, unit, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each unit in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The units described as separate parts may or may not be physically separate, and parts displayed as units may or may not be physical units, may be located in one position, or may be distributed on a number of network units. Some or all of the units can be selected based on actual demands to achieve the objectives of the solutions of the specification. A person of ordinary skill in the art can understand and implement the embodiments of the present application without creative efforts.

Referring again to FIG. 3, it can be interpreted as illustrating an internal functional unit and a structure of each of the entities for logistics management. An execution body in essence can be an electronic device, and the electronic device includes the following: one or more processors; and a memory configured to store an executable instruction of the one or more processors.

The techniques described in this specification produce one or more technical effects. In some embodiments, the data processing on hashing a block to a blockchain is split between a user terminal and a platform terminal, which saves the computing resources at the platform terminal. In some embodiments, the data processing at the user terminal, e.g., proposing a transaction, and the data processing at the platform terminal, e.g., verifying a transaction, are linked through a smart contract governing the overall data processing process. The use of the smart contract ensures that the data processing at the user terminal and the data processing at the platform terminal are consistent with one another. For example, the smart contract ensures that the data processing at the user terminal meets the standards or rules that the data is further processed at the platform terminal. The described techniques also help to protect personal data or commercially valuable trade secret data in the blockchain environment. In some embodiments, a user is certified by a third party certificate authority before registration with a blockchain network or a blockchain platform. The personal data or other commercially valuable information like trade secret is only provided to the third party certificate authority and is shielded from the computing nodes of a blockchain network or the blockchain platform. The verification of the personal information is conducted in a trustable manner at the third party certificate authority, while the third party certification is used as a qualification for a user to participate in the blockchain network. As such, an optimal balance is maintained between user authentication/certification and user privacy protection.

Described embodiments of the subject matter can include one or more features, alone or in combination.

For example, in a first embodiment, a computer-implemented method for logistics management includes storing a first smart contract in a blockchain. The smart contract corresponds to a logistic process that includes a plurality of sections. A first set of information is received from a user with respect to a first section of the plurality of sections. The first set of information is verified based on the smart contract. Based on a result of the verifying, the first set of information is added into the blockchain.

The foregoing and other described embodiments can each, optionally, include one or more of the following features:

A first feature, combinable with any of the following features, specifies that the verifying the first set of information based on the smart contract includes one or more of: verifying whether an identification of the user complies with the smart contract, or verifying whether the first set of information includes an identification of the first section that complies with the smart contract.

A second feature, combinable with any of the previous or following features, specifies that the first smart contract assigns a section identifier to each of the plurality of sections of the logistic process.

A third feature, combinable with any of the previous or following features, specifies that the first smart contract includes a user qualification for providing transaction information with respect to a section of the plurality of sections of the logistic process.

A fourth feature, combinable with any of the previous or following features, specifies that the user qualification includes a certificate issued by a certificate authority outside a blockchain platform supporting the blockchain.

A fifth feature, combinable with any of the previous or following features, specifies that the user qualification includes that a consumer user is registered with a certificate authority.

A sixth feature, combinable with any of the previous or following features, specifies that the method includes determining a consensus algorithm based on the first smart contract, and the verifying the first set of information follows the consensus algorithm.

A seventh feature, combinable with any of the previous or following features, specifies that the method further includes providing a software module to the user for processing the first set of information at a device of the user based on the first smart contract.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, one or more units of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a unit, a software unit, an engine, a script, or code, can be written in any form of programming language, including compiled or interpreted languages, or declarative or procedural languages; and it can be deployed in any form, including as a stand-alone program or as a unit, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, one or more scripts stored in a markup language document, in a single file dedicated to the program in question, or in multiple coordinated files, files that store one or more units, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, an FPGA (field programmable gate array), an ASIC (application specific integrated circuit), or a GPU (graphics processing unit). The apparatus can also include, in addition to hardware, code that creates an execution environment for computer programs, code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, a mobile telephone, a personal digital assistant (PDA), a mobile audio or video player, a game console, a Global Positioning System (GPS) receiver, or a portable storage device, a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (an L2 cache component) is "coupled to" the processor.

To provide for interaction with a user, embodiments of the subject matter described in this specification can be implemented on, or configured to communicate with, a computer having a display device, a LCD (liquid crystal display) monitor, for displaying information to the user, and an input device by which the user can provide input to the computer, a keyboard and a pointing device, a mouse, a trackball or touchpad. Other kinds of devices can be used to provide for interaction with a user as well; for example, feedback provided to the user can be any form of sensory feedback, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, a smartphone or electronic tablet. Also, a computer can interact with a user by sending text messages or other forms of message to a personal device, a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiment can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system units and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer-implemented method for logistics management, the method comprising:
    at a node of a blockchain network:
        identifying a first smart contract stored in a blockchain of the blockchain network, the first smart contract corresponding to a logistics process of transportation of a product, the first smart contract identifying the logistics process with a plurality of sections representing respective logistics transactions in the logistics process that are different from one another, for each section of the plurality of sections, respectively, the first smart contract identifying a section identifier and a participation qualification for a user to perform the respective logistics transaction of the section and to provide transaction information on the respective logistics transaction into the blockchain, each participation qualification including a qualification verified by the blockchain network, the plurality of sections including a first section representing a first logistics transaction of shipping the product by a transportation carrier and a second section representing a second logistics transaction of delivering the product to a transportation carrier, a first participation qualification for the first section being different from a second participation qualification for the second section, the first logistics transaction being later than the second logistics transaction in the logistics process;
        receiving a first set of information with respect to the first logistics transaction of the first section from a first user, the first set of information including a first section identifier and first transaction information of shipping the product;
        automatically verifying the first set of information by executing the first smart contract, the verifying including:
            analyzing whether the first section identifier belongs to the first section of the plurality of sections of the logistics process;
            analyzing whether the first user is a transportation carrier that meets the first participation qualification of the first section identified by the first smart contract; and
            analyzing whether transaction information on the second logistics transaction of delivering the product to a transportation carrier has been stored in the blockchain;
        adding the first set of information into the blockchain in response to that the first section identifier belongs to the first section, the first user is a transportation carrier that meets the first participation qualification of the first section and the transaction information on the second logistics transaction has been stored in the blockchain;
        rejecting the first set of information from being added into the blockchain in response to at least one of that the first section identifier does not belong to the first section, that the first user is not a transportation carrier that meets the first participation qualification of the first section, or that the transaction information on the second logistics transaction has not be been stored in the blockchain; and
        monitoring execution of the logistics process of transporting the product based on information stored in the blockchain.

2. The method of claim 1, wherein the verifying the first set of information based on the first smart contract includes one or more of:
    verifying whether the first set of information includes an identification of the first user that complies with the first smart contract.

3. The method of claim 1, wherein the first smart contract includes a user qualification for a user to provide transaction information with respect to a section of the plurality of sections of the logistics process based on a certified business scope of the user.

4. The method of claim 3, wherein the user qualification includes a certificate issued by a certificate authority outside a blockchain platform of the blockchain network supporting the blockchain.

5. The method of claim 3, wherein the user qualification includes that a consumer user is registered with a certificate authority.

6. The method of claim 1, further comprising determining a consensus algorithm based on the first smart contract, wherein the verifying the first set of information follows the consensus algorithm.

7. The method of claim 1, further comprising providing a software module to the first user for processing the first set of information at a device of the first user based on the first smart contract.

8. A system of logistics management, comprising:
    one or more processors; and
    one or more computer-readable memories coupled to the one or more processors and having instructions stored thereon that are executable by the one or more processors to perform acts including:
        identifying a first smart contract stored in a blockchain of a blockchain network, the first smart contract corresponding to a logistics process of transportation of a product the first smart contract identifying the logistics process with a plurality of sections representing respective logistics transactions in the logistics process that are different from one another, for each section of the plurality of sections, respectively, the first smart contract identifying a section identifier and a participation qualification for a user to perform the respective logistics transaction of the section and to provide transaction information on the respective logistics transaction into the blockchain, each participation qualification including a qualification verified by the blockchain network, the plurality of sections including a first section representing a first logistics transaction of shipping the product by a transportation carrier and a second section representing a second logistics transaction of delivering the product to a transportation carrier, a first participation qualification for the first section being different from a second participation qualification for the second section, the first logistics transaction being later than the second logistics transaction in the logistics process;

receiving, at a first node of the blockchain network, a first set of information from a first user with respect to the first section, the first set of information including a first section identifier and first transaction information of shipping the product;

automatically verifying, at the first node, the first set of information by executing the first smart contract, the verifying including:

analyzing whether the first section identifier belongs to the first section of the plurality of sections of the logistics process;

analyzing, whether the first user is a transportation carrier that meets the first participation qualification of the first section identified by the first smart contract; and analyzing whether transaction information on the second logistics transaction of delivering the product to a transportation carrier has been stored in the blockchain;

adding the first set of information into the blockchain in response to that the first section identifier belongs to the first section, the first user is a transportation carrier that meets the first participation qualification of the first section, and the transaction information on the second logistics transaction has been stored in the blockchain;

rejecting the first set of information from being added into the blockchain in response to at least one of that the first section identifier does not belong to the first section, that the first user is not a transportation carrier that meets the first participation qualification of the first section, or that the transaction information on the second logistics transaction has not be been stored in the blockchain; and monitoring execution of the logistics process of transporting the product based on information stored in the blockchain.

9. The system of claim 8, wherein the verifying the first set of information based on the smart contract includes one or more of:

verifying whether the first set of information includes an identification of the first user that complies with the first smart contract.

10. The system of claim 8, wherein the first smart contract includes a user qualification for providing transaction information with respect to a section of the plurality of sections of the logistics process based on a certified business scope of the user.

11. The system of claim 10, wherein the user qualification includes a certificate issued by a certificate authority outside a blockchain platform of the blockchain network.

12. The system of claim 10, wherein the user qualification includes that a consumer user is registered with a certificate authority.

13. The system of claim 8, where the acts include determining a consensus algorithm based on the first smart contract, and the verifying the first set of information follows the consensus algorithm.

14. The system of claim 8, where the acts include providing a software module to the first user for processing the first set of information at a device of the first user based on the first smart contract.

15. An apparatus for logistics management, the apparatus implementing a node of a blockchain network and comprising one or more processors and one or more computer-readable memories coupled to the one or more processors, the one or more computer-readable memories having instructions stored thereon that are executable by the one or more processors to perform acts including:

identifying a first smart contract stored in a blockchain of the blockchain network, the smart contract corresponding to a logistics process of transportation of a product, the smart contract identifying the logistics process with a plurality of sections representing logistics transactions in the logistics process that are different from one another, for each section of the plurality of sections, respectively, the first smart contract identifying a section identifier and a participation qualification for a user to perform the respective logistics transaction of the section and to provide transaction information on the respective logistics transaction into the blockchain, each participation qualification including a qualification verified by the blockchain network, the smart contract identifying a sequential order among the plurality of sections in conducting the respective transactions, the plurality of sections including a first section representing a first logistics transaction of shipping the product by a transportation carrier and a second section representing a second logistics transaction of delivering the product to a transportation carrier, a first participation qualification for the first section being different from a second participation qualification for the second section, the first section being later in the sequential order than the second section;

receiving a first set of information from a first user with respect to a transaction in the first section, the first set of information including a first section identifier and first transaction information of shipping the product;

automatically verifying the first set of information by executing the smart contract, the verifying including:

analyzing whether the first section identifier belongs to the first section, of the plurality of sections of the logistics process, analyzing whether the first user is a transportation carrier that meets the first participation qualification of the first section identified by the first smart contract, and determining whether transaction information on the second logistics transaction of delivering the product to a transportation carrier has been stored in the blockchain;

adding the first set of information into the blockchain in response to that the first section identifier belongs to the first section, the first user is a transportation carrier that meets the first participation qualification of the first section, and the transaction information on the second logistics transaction has been stored in the blockchain;

rejecting the first set of information from being added into the blockchain in response to at least one of that the first section identifier does not belong to the first section, that the first user is not a transportation carrier that meets the first participation qualification of the first section, or that the transaction information on the second logistics transaction has not been stored in the blockchain; and monitoring execution of the logistics process of transporting the product based on information stored in the blockchain.

16. The apparatus of claim 15, wherein the verifying the first set of information based on the first smart contract includes one or more of:

verifying whether the first set of information includes an identification of the first user that complies with the first smart contract.

17. The apparatus of claim 16, wherein the verifying determines whether the identification of the user is consistent with the identifier of the first section.

18. The apparatus of claim 15 wherein the first smart contract includes a user qualification for providing transaction information with respect to a section of the plurality of sections of the logistics process based on a certified business scope of the user.

19. The apparatus of claim 18, wherein the user qualification includes a certificate issued by a certificate authority outside a blockchain platform of the blockchain network.

20. The apparatus of claim 15, where the acts include providing a software module to the first user for processing the first set of information at a device of the first user based on the first smart contract.

\* \* \* \* \*